(12) United States Patent
Nagaya et al.

(10) Patent No.: US 12,013,065 B2
(45) Date of Patent: Jun. 18, 2024

(54) CONNECTOR

(71) Applicant: TOGO SEISAKUSYO CORPORATION, Aichi (JP)

(72) Inventors: Takanori Nagaya, Aichi-ken (JP); Shigeo Oi, Aichi-ken (JP)

(73) Assignee: TOGO SEISAKUSYO CORPORATION, Aichi-gun (JP)

( * ) Notice: Subject to any disclaimer, the term of this patent is extended or adjusted under 35 U.S.C. 154(b) by 42 days.

(21) Appl. No.: 17/775,306

(22) PCT Filed: Oct. 30, 2020

(86) PCT No.: PCT/JP2020/040807
§ 371 (c)(1),
(2) Date: May 8, 2022

(87) PCT Pub. No.: WO2021/090769
PCT Pub. Date: May 14, 2021

(65) Prior Publication Data
US 2022/0397221 A1   Dec. 15, 2022

(30) Foreign Application Priority Data
Nov. 8, 2019 (JP) .................................. 2019-202953

(51) Int. Cl.
*F16L 37/12*   (2006.01)
*F16L 43/02*   (2006.01)

(52) U.S. Cl.
CPC ........... *F16L 37/1225* (2013.01); *F16L 43/02* (2013.01); *F16L 2201/10* (2013.01)

(58) Field of Classification Search
CPC ......... F16L 43/02; F16L 37/08; F16L 37/088; F16L 37/0885; F16L 37/1225; F16L 37/12; F16L 37/1205; F16L 37/127; F16L 37/14; F16L 37/142; F16L 37/144
See application file for complete search history.

(56) References Cited

U.S. PATENT DOCUMENTS

2010/0025987 A1   2/2010   Nagaya et al.

FOREIGN PATENT DOCUMENTS

| CN | 106764182 A | 5/2017 | |
| GB | 2456994 | * 12/2007 | ............ F16L 37/08 |
| JP | 2001-227692 A | 8/2001 | |

(Continued)

*Primary Examiner* — Aaron M Dunwoody
(74) *Attorney, Agent, or Firm* — Diamantis Law, PLLC

(57) ABSTRACT

A connector includes a connector body having a hollow channel, and a retainer configured to prevent a pipe inserted into the hollow channel from being removed using a stopper piece. The retainer body lies along the outer peripheral surface of the retainer attachment portion. A bearing allows the retainer body to rotate from a temporary locking position to a main locking position. A detection piece passes through a detection hole and projects into the hollow channel when located in the temporary locked position, so as to be pushed in an axial direction by a bulge of the pipe. An inclined surface of the detection piece inclines with respect to the axial direction such that a pushing force can be converted to a radially outward force. A first energy conversion mechanism serves to convert the energy converted by the inclined surface to the rotational energy in the locking direction.

12 Claims, 16 Drawing Sheets

(56) References Cited

FOREIGN PATENT DOCUMENTS

| | | |
|---|---|---|
| JP | 2002-310363 A | 10/2002 |
| JP | 2004-125130 A | 4/2004 |
| JP | 2008-163976 A | 7/2008 |
| JP | 2015-048896 A | 3/2015 |

* cited by examiner

CONNECTOR

CROSS-REFERENCE TO RELATED APPLICATIONS

The present application is a U.S. National Phase entry of, and claims priority to, PCT Application PCT/JP2020/040807, filed Oct. 30, 2020, which claims priority to Japanese Patent Application No. 2019-202953, filed Nov. 8, 2019, both of which are incorporated herein by reference in their entireties for all purposes.

BACKGROUND

The present disclosure relates to connectors for piping connections.

JP2008-163976A and JP2015-048896A disclose connectors used for piping connections. These connectors include a substantially cylindrical connector body and a retainer movably connected to the connector body. A hollow channel is defined within the connector body along an axis. A pipe receiving portion, into which a pipe can be inserted, is provided at a first end of the hollow channel and a tube connecting portion, to which a tube can be connected, is provided at a second end. A bulge protruding radially outward over the entire circumference is formed at a location closer to a front end of the pipe. A stepped contact edge is formed on an inner circumference of the pipe receiving portion so as to project radially inward and along the circumferential direction. The pipe is inserted until the bulge comes in contact with or close to the contact edge.

A retainer is attached to the outer circumference of the pipe receiving portion close to the second end. The retainer functions to prevent the pipe from being removed. The retainer has substantially a C-shape. A rotary shaft extending in an axial direction is formed on the outer circumference of the connector body. An end of the retainer is rotatably supported by the rotary shaft. The retainer can rotate on a plane orthogonal to the axial direction of the pipe. The retainer can rotate about the rotary shaft with respect to the connector body.

The retainer has a detection piece at an end opposite to a bearing. The detection piece is locked in a detection hole penetrating the hollow channel from the outer peripheral surface of the connector body. When the pipe is inserted into the hollow channel of the connector body, the detection piece is pushed radially outward by the bulge so as to exit from the detection hole. As a result, the retainer can rotate from a temporary locked position to a main locked position on the center side of the connector body. The retainer has a removal stopper piece that projects radially inward from the inner peripheral edge. When the retainer reaches the main locked position, the removal stopper piece passes through an opening formed in the connector body and enters the hollow channel. In this way, the removal stopper piece is positioned behind the bulge such that the pipe is prevented from being removed from the connector body.

The retainers described in JP2008-163976A and JP2015-048896A are manually rotated by an operator from the temporary locked position to the main locked position. Therefore, a first operation of inserting the pipe into the connector body and a second operation of rotating the retainer are required, thereby making their operation complicated. In addition, it was necessary to rotate the retainer after confirming that the pipe was inserted into a proper position. Therefore, there has long been a need for a connector that can easily prevent a pipe from being removed out of the connector body.

BRIEF SUMMARY

According to one aspect of the present disclosure, a connector for piping connection has a connector body and a retainer. The connector body has a hollow channel. The retainer prevents a pipe inserted through the hollow channel of the connector body from being removed out of the connector body. The retainer has a retainer body, a rotary mounting portion, and a force receiving piece. The retainer body is formed in an arc shape, such that it can be attached along an outer peripheral surface of the connector body. The rotary mounting portion rotatably connects a base end of the retainer body to the connector body, so that the retainer body can rotate from the temporary locked position, toward the hollow channel of the connector body, and to the main locked position. When the retainer body is in the temporary locked position, the force receiving piece projects from the retainer body, through a detection hole of the connector body, and into the hollow channel. An inclined surface is formed on a bulge that projects radially outward from the pipe body of the pipe and/or on the force receiving piece. When the pipe is inserted into the connector body, the force receiving piece is pushed by the bulge in an axial direction of the pipe. The inclined surface is inclined with respect to the axial direction so as to convert the pushing force into a radially outward force of the force receiving piece.

Furthermore, the retainer has an energy conversion mechanism and a removal stopper piece. The energy conversion mechanism converts the radially outward force of the force receiving piece, which was converted on the inclined surface from the pushing force, into rotational energy of the retainer body in the locking direction from the temporary locked position to the main locked position. When the retainer is located at the main locked position, the removal stopper piece passes through a locking hole of the connector body and projects from the retainer body into the hollow channel. This allows the removal stopper piece to be adjacent to the bulge of the pipe in the axial direction and to prevent the pipe from being removed out of the connector body.

Therefore, when the pipe is inserted into the connector body, the force receiving piece is pushed by the bulge of the pipe and is subjected to the radially outward force. The retainer body automatically rotates in the locking direction from the temporary locked position to the main locked position, utilizing the radially outward force. The removal stopper piece prevents the pipe from being removed out of the connector body. The pipe can thus be prevented from being removed out of the connector body by the single operation of inserting the pipe into the connector body.

Moreover, the amount of movement of the retainer body from the temporary locked position to the main locked position can be increased utilizing the principle of leverage. The amount of movement of the force receiving piece pushed by the bulge of the pipe depends on the projecting length of the bulge. By rotating the retainer body and utilizing the principle of leverage, it is possible to convert a small displacement of the force receiving piece into a large displacement of the retainer body. This allows the amount of movement of the retainer body to be increased, while suppressing an increase in size of the connector. Furthermore, since the displacement of the retainer body is large, it is easy to visually confirm that the retainer body has moved to the main locked position.

Moreover, even if the rotation angle of the retainer body is the same, for example, the amount of displacement of a part of the retainer body with respect to the connector body can be changed by changing the shape of the retainer body. For example, the shape of the retainer body may be set so that a part of the retainer body farthest from the connector body moves depending on the rotation angle of the retainer body. This allows the displacement amount (head drop) of the retainer body with respect to the connector body to be increased, while maintaining the rotation angle of the retainer body. Alternatively, when using a structure in which the retainer body can be elastically deformed, the amount of displacement due to the elastic deformation of the retainer body can be changed.

Moreover, when the pipe is inserted into the connector body and the retainer body rotates from the temporary locked position to the main locked position, a sense of moderation can be conveyed to the operator. For example, when the bulge of the pipe and the contact surface of the force receiving piece of the retainer face each other in the axial direction of the pipe, there is a resistance when inserting the pipe. As the force receiving piece is pushed outward from the insertion channel of the pipe due to the radially outward force acting on the retainer, there is a timing when the bulge is released from the end of the force receiving piece. At this timing, the resistance of insertion disappears for a moment. The pipe then enters all the way through the thickness of the end of the force receiving piece and stops at a predetermined normal position. The sense of moderation is conveyed to the operator's hand when entering up to the normal position after the resistance has disappeared. This facilitates the operator's confirmation that the pipe has been inserted to the normal position and that the retainer has rotated to the main locked position.

According to another aspect of the present disclosure, the retainer has a temporary locking portion, in which it is temporarily locked to the connector body. The energy conversion mechanism elastically deforms the retainer body due to a radially outward force of the force receiving piece, thereby storing rotational energy. The energy conversion mechanism utilizes the stored rotational energy to release the temporary locking portion from the connector body and to rotate the retainer body from the temporary locked position to the main locked position.

Therefore, the energy conversion mechanism obtains rotational energy by utilizing the elastic deformation of the retainer body. This allows the retainer to automatically rotate from the temporary locked position to the main locked position. The amount of elastic deformation of the retainer body tends to increase as the radially outward force of the force receiving piece increases. At the initial stage when the force receiving piece starts being pushed radially outward by the bulge, the amount of elastic deformation of the retainer body is small. The amount of elastic deformation of the retainer body tends to increase as the amount of the force receiving piece being pushed radially outward increases. Therefore, when the pipe is inserted in the axial direction, the energy caused by the elastic deformation of the retainer body increases, and the retainer can be rotated more vigorously utilizing the energy. Thus, the retainer can be more reliably rotated from the temporary locked position to the main locked position.

Moreover, by utilizing the elastic deformation of the retainer body, it is possible to increase the sense of moderation when the retainer body rotates from the temporary locked position to the main locked position. For example, the sense of moderation can be increased by synchronizing the timing of the release of energy accumulated by the elastic deformation of the retainer body and the timing at which the bulge of the pipe is released from the end of the force receiving piece.

According to another aspect of the present disclosure, the force receiving piece is a detection piece that also serves as a temporary locking portion. The force receiving piece has such a structure that the force receiving piece is temporary locked to an edge of the detection hole due to moving radially outward when the pipe is being inserted into the connector body. Therefore, the force receiving piece moves radially outward by inserting the pipe into the connector body. The force receiving piece temporarily locks to the connector body, which retains the rotational energy caused by the elastic deformation of the retainer body. When a predetermined amount of rotational energy is obtained, or as the force receiving piece gradually moves in the direction in which the force receiving piece is released, the force receiving piece detaches from the connector main body. The retainer can thus rotate from the temporary locked position to the main locked position utilizing the stored rotational energy.

According to another aspect of the present disclosure, the force receiving piece is located at the tip end of the retainer body. The retainer includes a rotation restriction portion extending from the rotary mounting portion. The rotation restriction portion abuts the connector body so as to prevent the retainer body from rotating in a direction opposite do the locking direction due to the force applied to the force receiving piece.

Therefore, the force receiving piece moves radially outward by inserting the pipe into the connector body. The rotation restriction portion serves to prevent the retainer body from rotating in the direction opposite to the locking direction. The retainer body elastically deforms with the rotation mounting portion acting as a fulcrum, such that the rotational energy is stored. The rotational energy is greatly exerted at a tip end of the retainer body due to the principle of leverage. For instance, this may be due to the tip end of the retainer body being shifted away from the rotary mounting portion, with the rotary mounting portion acting as the fulcrum. This allows the retainer to rotate more vigorously from the temporarily locked position to the main locked position utilizing the elastic deformation of the retainer body.

According to another aspect of the present disclosure, the retainer includes a driving piece projecting radially inward from the rotary mounting portion. When the retainer is in the temporary locked position, the driving piece passes through a second detection hole of the connector body and extends from the retainer body and into the hollow channel. A second inclined surface is formed on the driving piece or the bulge. The second inclined surface inclines with respect to the axial direction, such that when the bulge of the pipe applies a force pushing the driving piece in the axial direction of the pipe as the pipe is inserted into the connector body, the force is converted to a radially outward force of the driving piece. The retainer includes a second energy conversion mechanism that serves to convert the radially outward force into the rotational energy of the retainer body in the locking direction from the temporary locked position to the main locked position.

Therefore, the stored rotational energy in the locking direction can also be obtained by the second energy conversion mechanism as the pipe is inserted into the connector body and as the driving piece moves radially outward. The retainer in the temporary locked position is also forced to rotate in the locking direction due to the rotational energy obtained with the second energy conversion mechanism. In addition, the rotational energy accumulated by the first energy conversion mechanism, which utilizes the force receiving piece, is also utilized to bias the retainer toward the main locked position. Further, the retainer can more reliably rotate to the main locked position using the driving piece as the pipe moves to the normal position. This ensures the retainer fully rotates from the temporary locked position to the main locked position.

According to another aspect of the present disclosure, the force receiving piece is a driving piece that projects radially inward from the rotary mounting portion. The driving piece passes through the detection hole of the connector body and projects into the hollow channel. Therefore, the retainer body has two force receiving pieces, one on each side. Inserting the pipe into the connector body allows the force receiving pieces on the both sides to move radially outward. This allows the retainer body to open from both sides and to accumulate greater rotational energy. The retainer thus can vigorously rotate from the temporary locked position to the main locked position utilizing the elastic deformation of the retainer body.

According to another aspect of the present disclosure, the connector includes a rotary shaft at either one of the rotary mounting portion or the connector body. The other one of the rotary mounting portion or the connector body is formed with a shaft hole. The shaft hole is larger than the rotary shaft and is configured such that the rotary shaft may be inserted therein. The rotary mounting portion of the retainer may, for example, be movably supported in the radial direction relative to the connector body and may be movably supported by the rotary shaft and the shaft hole. Therefore, by the rotary shaft being movable, for example, in the radial direction within the shaft hole, the region in the vicinity of the rotary mounting portion of the retainer body is allowed to move radially outward. This allows the amount of elastic deformation of the retainer body to further increase. The rotational energy obtained due to elastic deformation can thus be increased. As a result, the retainer can be vigorously rotated from the temporary locked position to the main locked position.

According to another aspect of the present disclosure, the energy conversion mechanism is configured to generate torque to rotate the retainer body about the rotary mounting portion from the temporary locked position to the main locked position. This may be due to the radially outward force of the force receiving piece. Therefore, the retainer is forced to rotate from the temporary locked position to the main locked position only by operation of the pipe being inserted into the connector body. As a result, the retainer can prevent the pipe, which is connected to the connector body, from coming off.

According to another aspect of the present disclosure, the retainer body has a length long enough to cover the outer peripheral surface of the connector body such that the retainer is attached to the connector body. The force receiving piece projects radially inward from the base end of the retainer body. The rotary mounting portion is provided on the side of the retainer body that is radially outward of the side with the force receiving piece. The rotary mounting portion is provided at the tip end side, which is located on the opposite side of the retainer body that has the base end. The connector includes a rotary shaft at either one of the rotary mounting portion of the retainer or the connector body. The other one of the rotary mounting portion or the connector body is formed with a shaft hole, into which the rotary shaft is inserted.

Therefore, the force receiving piece moves radially outward due to the pipe being into the connector body. This movement occurs when the retainer is positioned at the temporary locked position. The tip end of the retainer body rotates radially inward about the rotary shaft on the base end side of the retainer body, due to the principle of leverage. This rotation in the locking direction causes the retainer to move from the temporary locked position to the main locked position. Thus, by moving the force receiving piece radially outward, this allows the retainer body to move from the temporary locked position to the main locked position. Accordingly, the retainer body covers the outer peripheral surface of the connector body when it is positioned in the main locked position. As a result, the retainer is retained with respect to the connector body.

DETAILED DESCRIPTION

Figure 1:
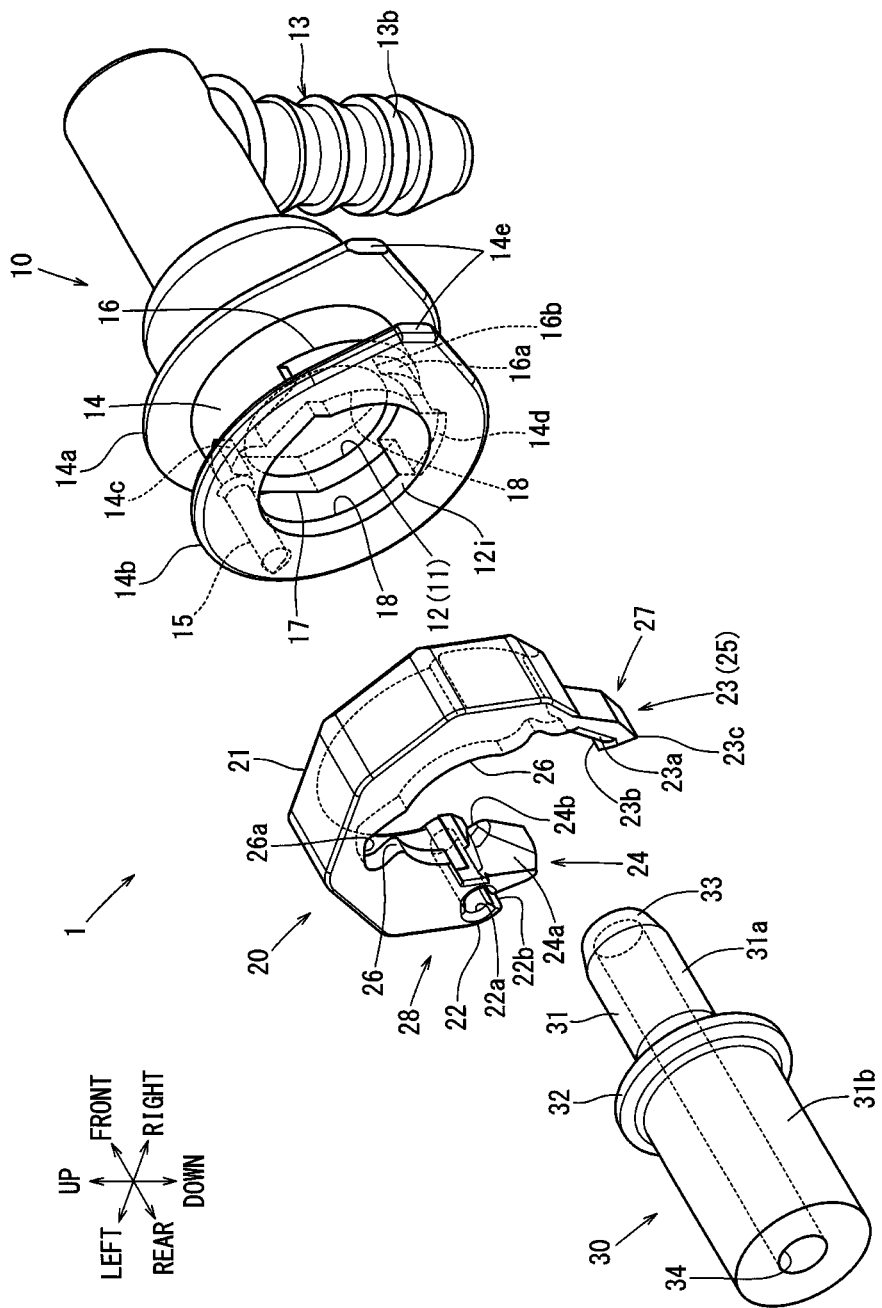
FIG. 1 is an exploded perspective view of a connector according to a first embodiment.

A first exemplary embodiment will be described with reference to FIGS. 1 to 9. As shown in FIG. 1, a connector may include a substantially cylindrical connector body 10 and a substantially C-shaped retainer 20, both of which are integrally formed of, for example, a synthetic resin material. A pipe 30 is inserted into the connector body 10 through an opening formed in one end of the connector body 10. The pipe 30 is prevented from being removed out of the connector body 10 by the retainer 20. The connector body 10 includes a tube connecting portion 13 on the other end. A tube (not shown) is connected to the tube connecting portion 13. This allows the connector body 10 to fluidly connect the pipe 30 and the tube. In the following description, the left/right direction is defined with respect to the connector 1 being in a posture as viewed from behind, with the opening side of the connector body 10 as the rear side and the extending direction of the tube connecting portion 13 as the lower side. The directions in the drawings are merely used for the convenience of this description, and the directions of the connector 1 when it is installed shall not be limited to the directions shown in the drawings.

Figure 8:
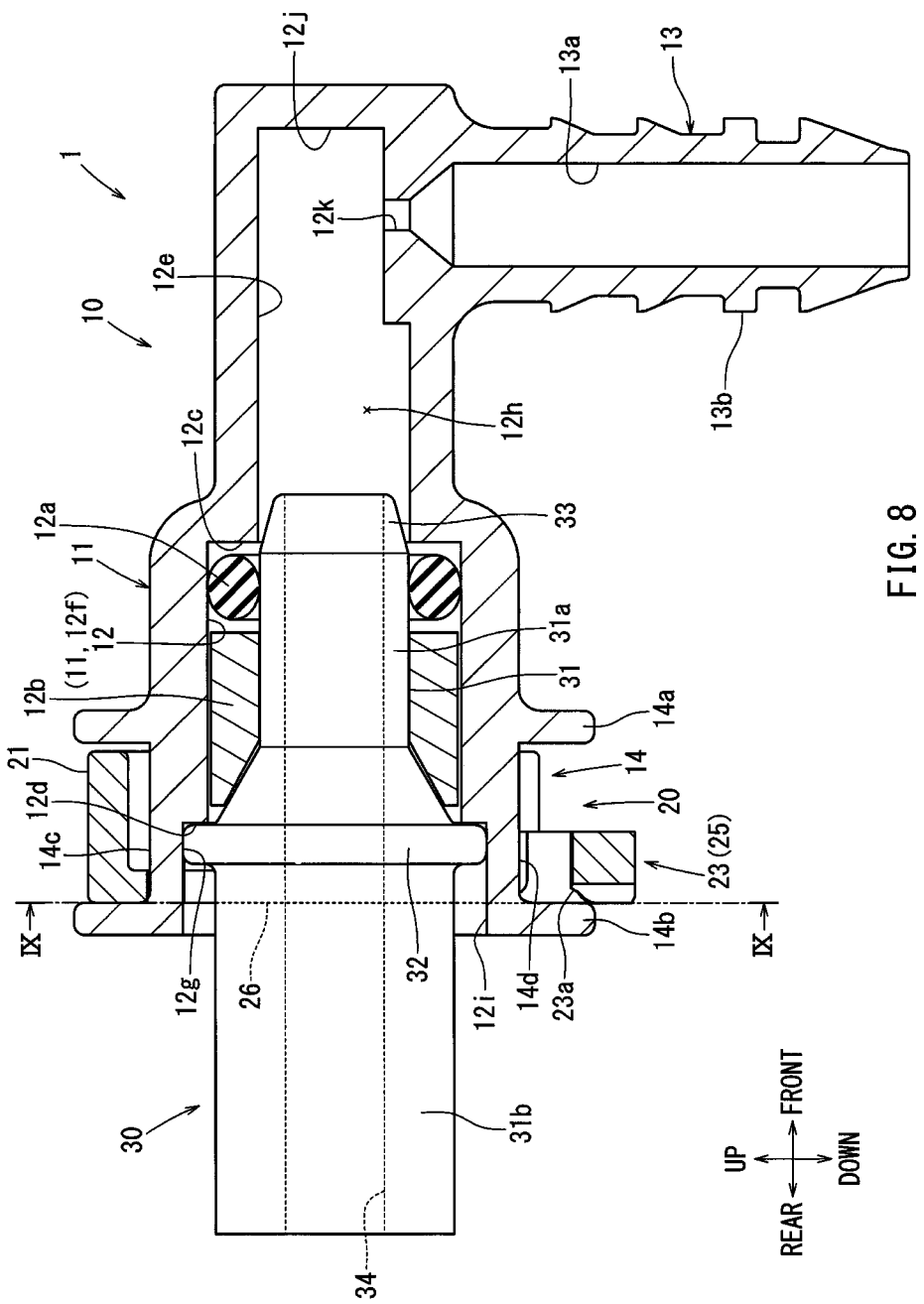
FIG. 8 is a cross-sectional view corresponding to the sectional view taken along a line VIII-VIII in FIG. 5 when the retainer is positioned at the main locked position.

As shown in FIGS. 1 and 8, the connector body 10 includes a hollow channel 11 formed on the inside and running along an axis. The connector body 10 is formed in an L-shape. The connector body 10 includes a pipe receiving portion 12 and a tube connecting portion 13, the tube connecting portion 13 being bent substantially perpendicular from the pipe receiving portion 12 and extending continuously. The tube connecting portion 13 includes a flow channel 13a extending at its center in an up/down direction. An uneven removal stopper portion 13b, which functions to prevent the tube from coming off, is formed around an outer peripheral surface of the tube connecting portion 13. The removal stopper portion 13b includes an annular portion with different diameters connected in the axial direction. An upper end of the flow channel 13a communicates a front end of a flow channel 12h of the pipe receiving portion 12.

As shown in FIGS. 1 and 8, the pipe receiving portion 12 includes the flow channel 12h extending at its center in the front/rear direction. The pipe receiving portion 12 has an opening 12i at a rear end and a bottom surface 12j at a front end. A communication opening 12k that communicates with the flow channel 13a within the tube connecting portion 13 is formed in a lower portion of the flow channel wall surface, which is located at a front portion of the flow channel 12h.

As shown in FIG. 1, a front flange 14a and a rear flange 14b are provided in parallel in a front and rear position and around a rear outer periphery of the pipe receiving portion 12. A retainer 20 is installed in a retainer attachment portion 14 between the front flange 14a and the rear flange 14b. An interval between the front flange 14a and the rear flange 14b is substantially equal to a front-to-rear width of the retainer 20 or is formed slightly wider. The front flange 14a and the rear flange 14b are formed around the entire periphery and project radially outward of the pipe receiving portion 12. The front flange 14a and the rear flange 14b have an annular shape and may have, for example, a projecting portion 14e on the right side that projects further in a radial direction than the other portions.

As shown in FIG. 1, the retainer attachment portion 14 includes a locking hole 18 between the front flange 14a and the rear flange 14b. The locking hole 18 has a circular arc shape along the front surface of the rear flange 14b and passes through a wall surface of the retainer attachment portion 14 in a radial direction. The locking hole 18 is partitioned by an upper partitioning piece 14c and a lower partitioning piece 14d, both of which extend in the front/rear direction between the front flange 14a and the rear flange 14b. A reduction in the strength of the retainer attachment portion 14 is prevented by reducing an opening area of the locking hole 18, such as by the above mentioned partitioning.

Figure 3:
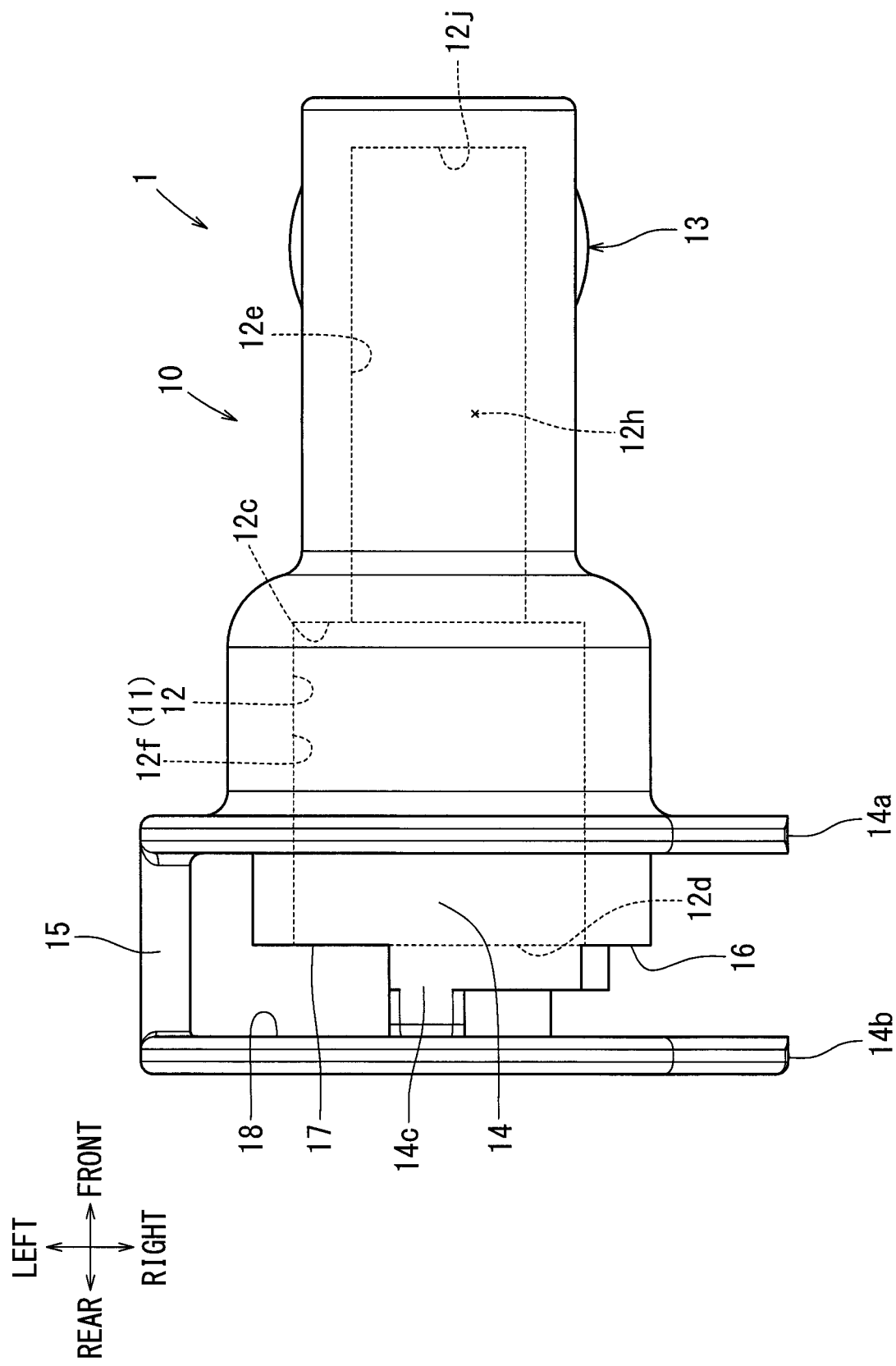
FIG. 3 is a top view of the connector body.

As shown in FIGS. 1 and 3, the retainer attachment portion 14 includes detection holes 16, 17 passing through the wall surface of the retainer attachment portion 14 in a radial direction. The detection holes 16, 17 open in front of the locking hole 18. Both of the detection holes 16, 17 communicate with the locking hole 18. One detection hole 16 is formed in a right region of the retainer attachment portion 14. Another detection hole (second detection hole) 17 is formed in a left region of the retainer attachment portion 14. The detection holes 16, 17 are separated from each other by the upper partitioning piece 14c and the lower partitioning piece 14d. A columnar rotary shaft (rotary mounting portion) 15 extending in the front/rear direction is provided on a left portion of the retainer attachment portion 14. The rotary shaft 15 integrally connects the front flange 14a and the rear flange 14b in a direction along the axial direction of the connector body 10. The rotary shaft 15 is arranged radially outward of the detection hole 17 and the locking hole 18.

Figure 2:
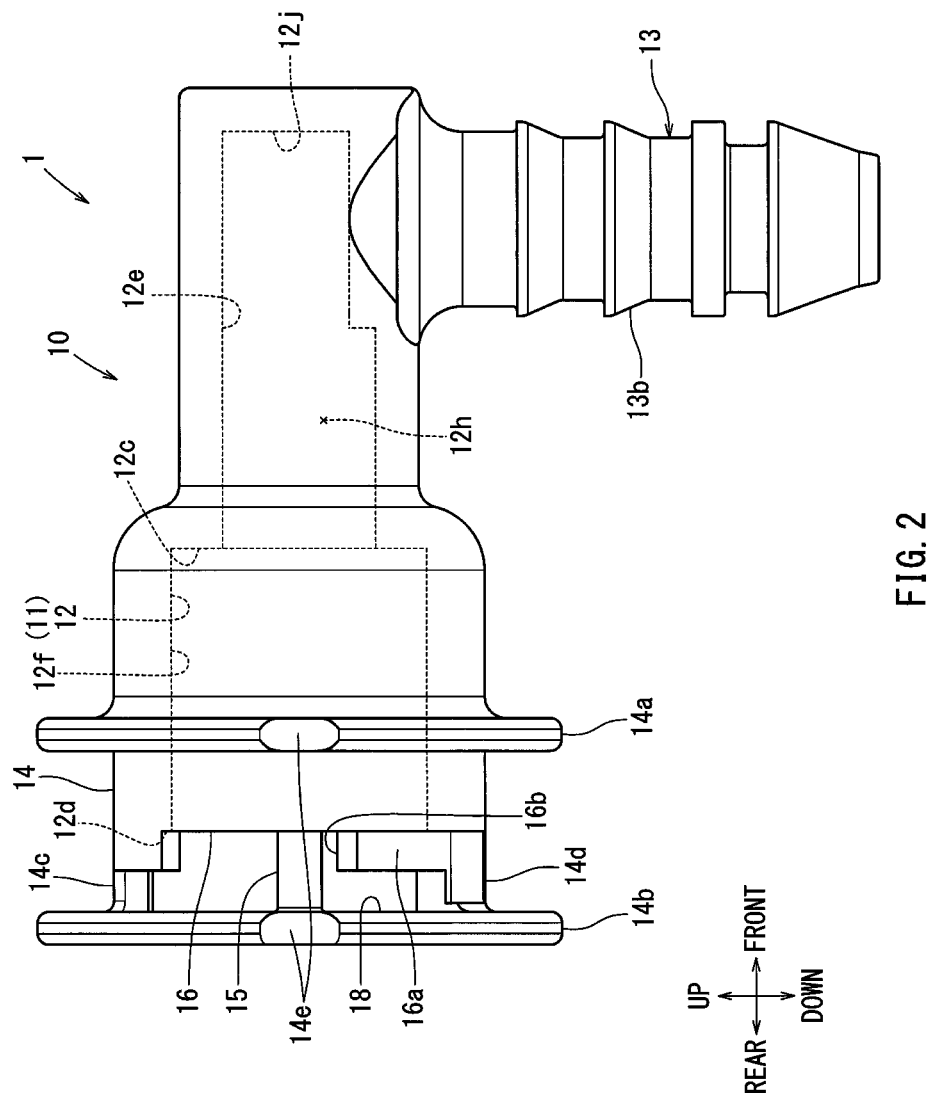
FIG. 2 is a side view of a connector body.
Figure 7:
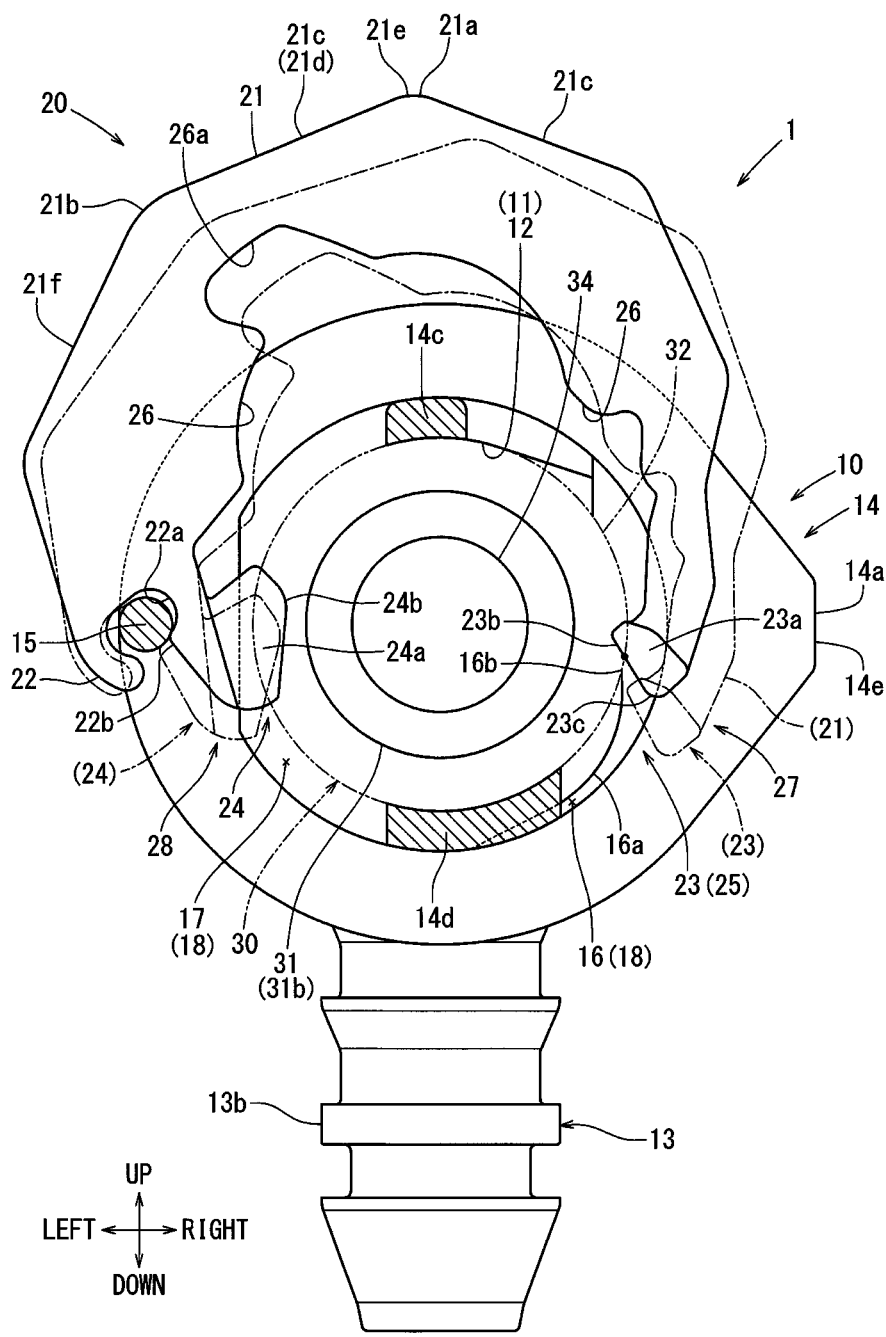
FIG. 7 is a cross-sectional view corresponding to FIG. 6 when the retainer moves from the temporary locked position to a main locked position.

As shown in FIGS. 2 and 7, a movement restricting edge 16b is provided at a lower end of the detection hole 16. The movement restriction edge 16b has a circular arc shaped chamfer. A thin portion 16a projecting to form an arc shape in a circumferential direction of the retainer attachment portion 14 is formed under the movement restricting edge 16b. The thin portion 16a is formed in an area along the circumferential direction up to the point of reaching the lower end of the locking hole 18. The thin portion 16a may have an equal width to that of the movement restricting edge 16b.

As shown in FIG. 1, the pipe 30 includes a cylindrical pipe body 31. A bulge 32 radially projecting over the entire periphery is formed on the pipe body 31 in a position closer to the front end. The pipe body 31 and the bulge 32 are integrally formed and may be made of metal, such as, for example, aluminum. The pipe body 31 includes a flow channel 34 extending in the front/rear direction at its center. The flow channel 34 opens forward at the front end portion 33 of the pipe body 31. The front end portion 33 has a tapered portion at a circumferential side portion, such that the diameter at the front end side is reduced. A front portion 31a of the pipe body 31 in front of the bulge 32 has a smaller diameter than a rear portion 31b behind the bulge 32 of the pipe body 31.

As shown in FIG. 8, a first region 12e, a second region 12f, and a third region 12g, each having a circular cross section and a different inner diameter, are formed adjacent one another in the front/rear direction on an inner periphery of the pipe receiving portion 12. The foremost first region 12e is formed in an area between the bottom surface 12j and substantially the center of the pipe receiving portion 12 in the front/rear direction. The first region 12e has a communication opening 12k. The first region 12e includes an inner diameter smaller than the outer diameter of the front portion 31a, into which substantially a front half of the front end portion 33 of the pipe 30 can enter. The second region 12f extends from the rear end of the first region 12e. The second region 12f extends to a middle position between the front flange 14a and the rear flange 14b in the front/rear direction. The second region 12f has an inner diameter that is larger than the outer diameter of the front portion 31a of the pipe 30 and smaller than the diameter of the bulge 32.

As shown in FIG. 8, the third region 12g extends from the rear end of the second region 12f to the rear end of the connector body 10. The third region 12g has a slightly larger inner diameter than the bulge 32. A stepped portion 12c is formed between the first region 12e and the second region 12f by steps extending in a radial direction. A contact edge 12d is formed between the second region 12f and the third region 12g by the steps in the radial direction, the contact edge 12d being oriented rearward.

As shown in FIG. 8, an O-ring 12a and a bushing 12b are provided inside the second region 12f. The O-ring 12a is arranged along a rear surface of the stepped portion 12c. The O-ring 12a can seal the outer peripheral surface of the front end portion 33. The bushing 12b is arranged behind the O-ring 12a to prevent the O-ring from being detached. The bushing 12b has a slightly larger inner diameter than the outer diameter of the front portion 31a. The pipe 30 can be inserted up to the position where the front surface of the bulge 32 abuts or comes in close contact with a rear surface of the contact edge 12d (normal depth). The bulge 32 of the pipe 30, once inserted to its normal depth, is positioned between the front flange 14a and the rear flange 14b.

Figure 9:
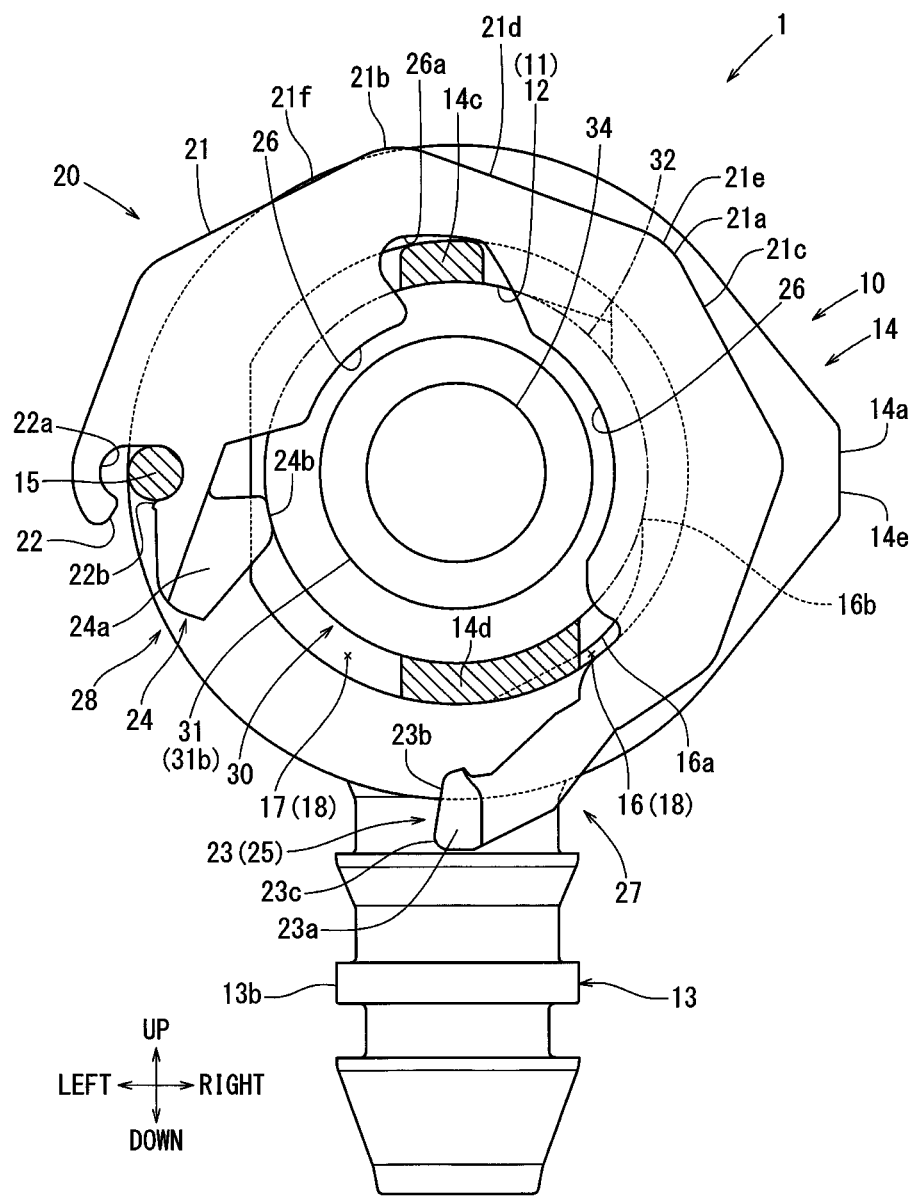
FIG. 9 is a sectional view taken along a line IX-IX in FIG. 8.

As shown in FIG. 1, the retainer 20 includes a retainer body 21 having substantially a C-shape. The retainer body 21 has a width that fits between the front flange 14a and the rear flange 14b. As shown in FIG. 9, the retainer body 21 can be attached to the retainer attachment portion 14 along the outer peripheral surface of the retainer attachment portion 14, once the retainer 20 has been moved to the main locked position. The retainer body 21 has a length sufficient to cover more than a half of the outer peripheral surface of the retainer attachment portion 14.

Figure 4:
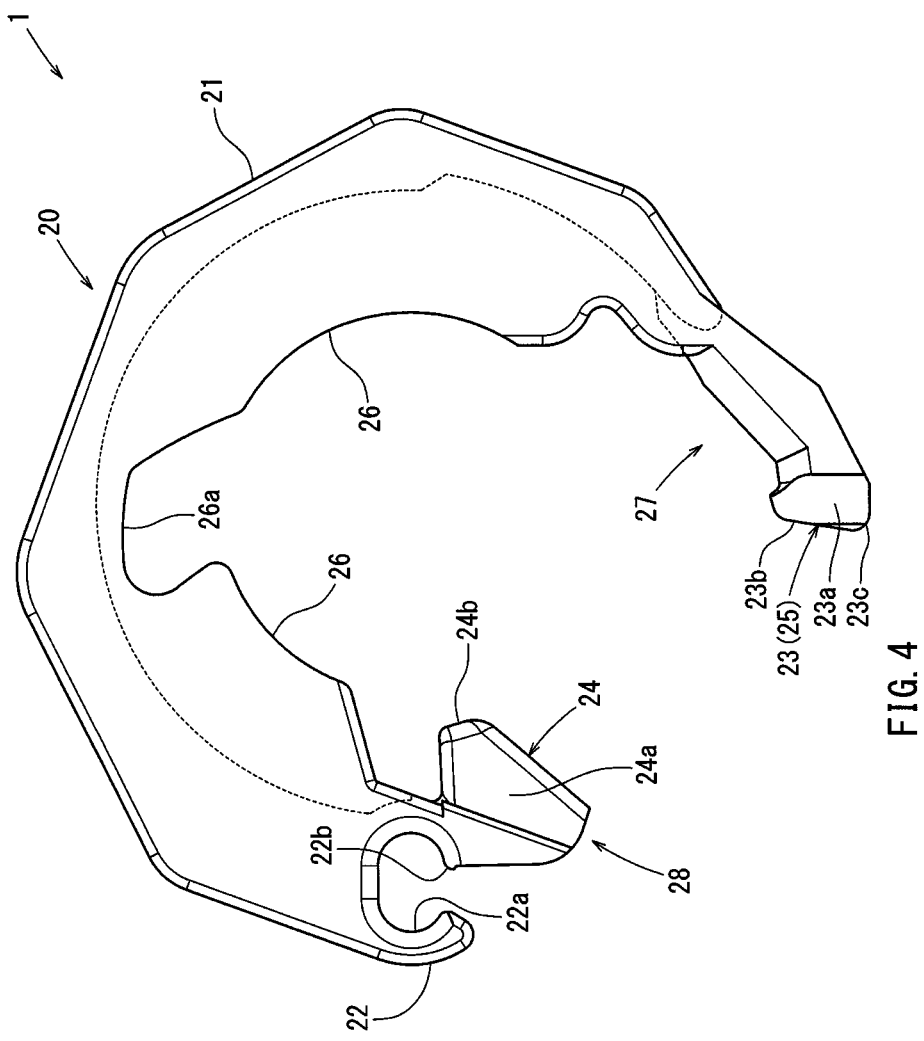
FIG. 4 is a rear view of a retainer.

As shown in FIG. 4, the retainer 20 includes a bearing portion 22 at a base end (left side in FIG. 4) of the retainer body 21. The bearing portion 22 is configured to be fitted to the rotary shaft 15 shown in FIG. 1. The retainer 20 includes a driving piece (force receiving piece) 24 on the inner peripheral side of the base end. The retainer 20 includes a detection piece (force receiving piece) 23 at a tip end opposite to the bearing portion 22 (lower right end in FIG. 4). The retainer 20 includes a removal stopper piece 26 projecting radially inward from the inner peripheral edge of the retainer body 21.

As shown in FIG. 4, the bearing portion 22 is formed to have substantially a C-shaped cross-section that is formed over the entire front-to-rear width of the retainer 20. An opening of the bearing portion 22, which in this embodiment is structured with a substantially C-shaped cross-section, is formed as an insertion opening 22b into which the rotary shaft 15 can be inserted. The bearing portion 22 includes a shaft hole 22a that is recessed inward from the insertion opening 22b. The shaft hole 22a has an elongated circular shape or a rectangular shape, the shaft hole 22a having a longitudinal diameter extending along the radial direction of the retainer body 21. The retainer 20 can rotate about the rotary shaft 15 relative to the connector body 10. The retainer 20 can rotate along a plane orthogonal to the axial direction of the pipe 30. The retainer 20 can rotate to the temporary locked position shown in FIG. 6, to the intermediate position between the temporary locked position and the main locked position shown in FIG. 7, and to the main locked position shown in FIG. 9. The bearing portion 22 is allowed to move in a radial direction along the longitudinal diameter direction of the shaft hole 22a, relative to the rotary shaft 15.

Figure 5:
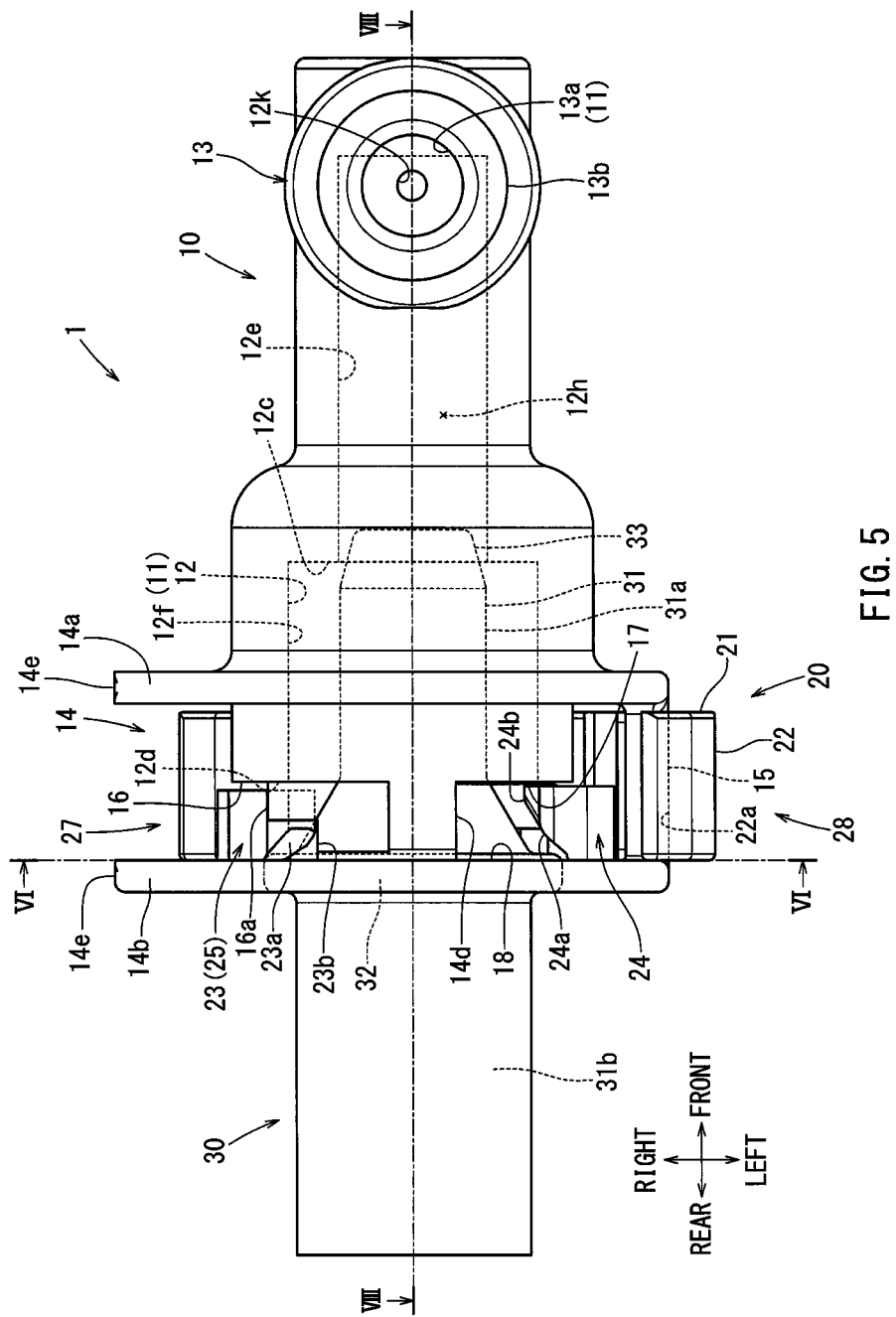
FIG. 5 is a bottom view of the connector when the retainer is positioned at a temporary locked position.
Figure 6:
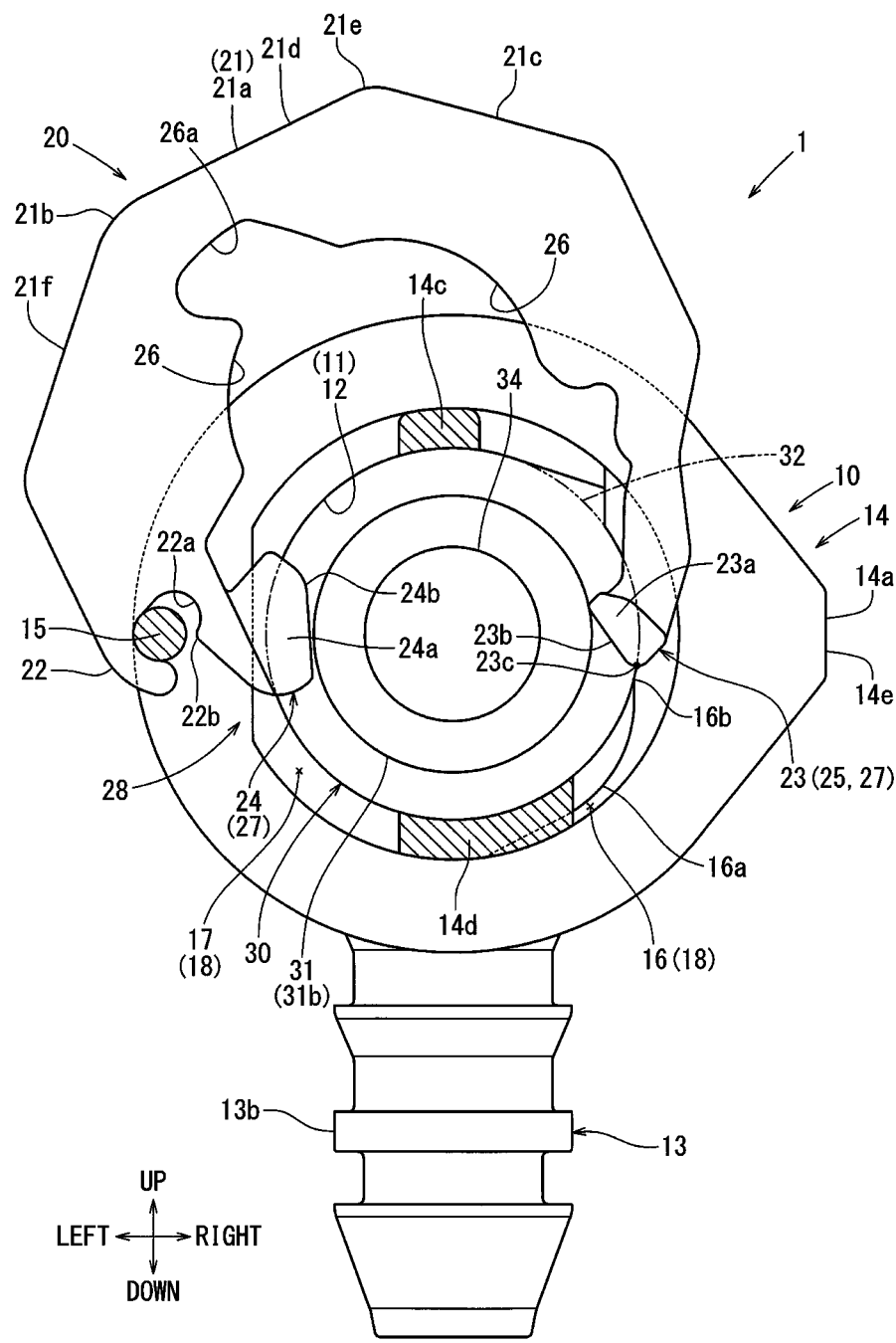
FIG. 6 is a sectional view taken along a line VI-VI in FIG. 5.

As shown in FIG. 5, the driving piece 24 has a width corresponding to substantially half of the front-to-rear width of the retainer body 21. The driving piece 24 is positioned closer to the rear flange 14b than the front flange 14a. The driving piece 24 projects radially inward from the retainer body 21 and toward the circumferential center of the retainer body 21, thereby forming a wedge shape. The driving piece 24 has a projecting portion 24b at the projecting end. As shown in FIGS. 6 and 7, the driving piece 24 enters from the detection hole 17 and projects into the hollow channel 11. The driving piece 24 may project into the hollow channel 11 while the retainer 20 rotates from the temporary locked position to the main locked position. The driving piece 24 is thus allowed to abut the bulge 32 of the pipe 30 that is inserted into the hollow channel 11 while rotating from the temporary locked position to the main locked position.

As shown in FIG. 5, an inclined surface (second inclined surface) 24a is formed on a rear surface of the driving piece 24. The inclined surface 24a is inclined so as to be tapered in a direction from the radially inner side toward the outer side along a direction between the front side and the rear side. The inclined surface 24a includes a gradient to convert a force from one direction to another. For instance the inclined surface 24a, while being abutted to the bulge 32, may convert a partial force pushing the pipe 30 toward the front side into a radial force pushing the driving piece 24 radially outward from the detection hole 17.

As shown in FIG. 5, the detection piece 23 has a width corresponding to substantially half of the front-to-rear width of the retainer body 21. The detection piece 23 is located closer to the rear flange 14b than the front flange 14a. The detection piece 23 projects radially inward from the retainer body 21. The detection piece 23 may be formed in a wedge shape. The detection piece 23 has a tip end portion 23b at the projecting end. As shown in FIGS. 6 and 7, a branch portion 23c is provided in a middle position of the end edge of the tip end portion 23b. The end edge of the tip end portion 23b extends along the circumferential direction of the retainer body 21 and extends radially outward on the right side of the branch portion 23c. The end edge of the tip end portion 23b extends radially inward of the retainer body 21 on the left side of the branch portion 23c. The detection piece 23 may remain in the detection hole 16 and project into the hollow channel 11 until the retainer 20 has been pushed by the bulge 32 out of the temporary locked position. This allows the detection piece 23 to abut the bulge 32 of the pipe 30 when the pipe 30 is being inserted into the hollow channel 11. The detection piece 23 also serves as a temporary locking portion 25 for temporary locking the retainer 20 to the retainer attachment portion 14.

As shown in FIG. 5, an inclined surface 23a is formed on a rear surface of the detection piece 23. The inclined surface 23a may be inclined so as to be tapered in a direction from the radially inner side toward the outer side along a direction between the front side and the rear side. The inclined surface 23a includes a gradient to convert a force from one direction to another. For instance, the inclined surface 23a, when abutting the pipe 30, converts a partial force causing the pipe 30 to be inserted to the front side into a radial force pushing the detection piece 23 out of the detection hole 16.

As shown in FIGS. 1 and 4, the removal stopper piece 26 has a width that is substantially one-quarter of the front-to-rear width of the retainer body 21. The removal stopper piece 26 is positioned along the rear edge of the retainer body 21. The removal stopper piece 26 is integrally formed with the retainer body 21. The removal stopper piece 26 has a projecting length so that it may be adjacent to a rear side of the bulge 32. The removal stopper piece 26 has a projecting length that substantially reaches the outer peripheral surface of the rear part 31b of the pipe body 31 when the retainer 20 has moved to the main locked position. The removal stopper piece 26 is in a position outside the pipe receiving portion 12 when the retainer 20 is positioned at the temporary locked position. This positioning may more easily allow for the entry or removal of the pipe 30. A relief recess 26a is formed in the circumferential center of the removal stopper piece 26. The relief recess 26a serves to avoid interference between the removal stopper piece 26 and the upper partitioning piece 14c as the retainer 20 moves from the temporary locked position to the main locked position. The relief recess 26a is also used as a point of origin to facilitate the elastic deformation of the retainer body 21.

As shown in FIG. 6, the retainer body 21 includes a first energy conversion mechanism 27. The first energy conversion mechanism 27 receives the rotational energy in a locking direction (clockwise direction in FIG. 6) utilizing the detection piece 23 and the driving piece 24. The retainer body 21 receives the rotational force in a direction opposite to the locking direction. This is due in part to the radially outward rotational force placed on the detection piece 23, which was converted from the linear force via the inclined surface 23a. The retainer body 21 is restricted from rotating in the direction opposite to the locking direction due to the radially outward force placed on the driving piece 24, which was converted from the linear force via the inclined surface 24a. The right region (as seen in FIG. 6) of the retainer body 21 elastically deforms so as to expand radially outward. This deformation may occur due in part to its rotation in the direction opposite to the locking direction being restricted and in part due to it being subjected to the rotational force in the direction opposite to the locking direction. The first energy conversion mechanism 27 serves to convert the force accumulated due to the elastic deformation of the retainer body 21 into the rotational energy of the retainer body 21 in the locking direction.

As shown in FIG. 9, the retainer body 21 includes a second energy conversion mechanism 28. The second energy conversion mechanism 28 serves to convert the radially outward force of the driving piece 24, which may be converted from the linear force via the inclined surface 24a, into rotational energy in the locking direction. The retainer body 21 is allowed to move from the temporary locked position to the main locked position as it rotates in the locking direction. The second energy conversion mechanism 28 may be configured to include, for example, the elastically deformable retainer 20 and the rotary shaft 15, which serves as a point of origin for the elastic deformation of the retainer 20. More specifically, the retainer 20 elastically deforms with the rotary shaft 15 as a point of origin as the driving piece 24 is subjected to a force. The retainer 20 rotates about the rotary shaft 15 in the locking direction in part utilizing elastic deformation.

A locking structure of the retainer 20 with respect to the connector body 10 will be described. As shown in FIG. 6, the retainer 20 is temporary held to the retainer attachment portion 14 in the temporary locked position. This is in part due to the detection piece 23 being locked with the movement restriction edge 16b. The detection piece 23 is locked with the movement restricting edge 16b on the right side of the branch portion 23c of the tip end portion 23b. The movement restricting edge 16b serves to restrict the unintentional rotation of the retainer 20 from the temporary locked position to the main locked position. The rotary shaft 15 abuts the substantially semi-circumferential surface on the left side of the shaft hole 22a when the retainer 20 is in the temporary locked position. Therefore, the left region of the retainer body 21 is less subjected to elastic deformation in radially outward or prevented from elastically deformed. Thus, the rotational energy obtained from the first energy conversion mechanism 27 is relatively small. This allows the detection piece 23 to be temporary held in the temporary locked position.

As shown in FIG. 7, the bulge 32 comes in contact with the inclined surface 23a of the detection piece 23 and the inclined surface 24a of the driving piece 24. This contact may occur as the pipe 30 is gradually inserted into the hollow channel 11. The detection piece 23 is pushed radially outward from the detection hole 16 by the bulge 32. This causes the right region (as seen in FIG. 7) of the retainer body 21 to elastically deform so as to expand radially outward. The force due to the elastic deformation is accumulated around the relief recess 26a of the retainer body 21. The detection piece 23 is locked to the movement restriction edge 16b on the left side of the branch portion 23c of the tip end portion 23b of the detection piece 23. More specifically, the position at which the tip end portion 23b is locked to the movement restriction edge 16b switches from the right side to the left side of the branch portion 23c during this elastic deformation (a schematic of an embodiment of the locking position can be seen by the black dot in FIGS. 6 and 7).

As shown in FIG. 7, the driving piece 24 is pushed radially outward from the detection hole 17 by the bulge 32 of the pipe 30 as the bulge 32 is inserted into the hollow channel 11. This causes a small rotational force that allows the retainer body 21 to rotate in the locked direction. This force may be exerted on the left region (as seen in FIG. 7) of the retainer body 21. In the state shown in FIG. 7, the rotational force in the locking direction may not yet be strong enough to release the locked state of the tip end portion 23b of the detection piece 23 from the movement restricting edge 16b. Therefore, the retainer body 21 is locked in the temporary locked position. The retainer body 21 is restricted from rotating in the direction opposite to the locking direction and the right region (as seen in FIG. 7) of the retainer body 21 is elastically deformed. As a result, the first energy conversion mechanism 27 obtains the rotational energy, which may then be used to allow the retainer body 21 to rotate in the locking direction.

As shown in FIG. 7, when the pipe 30 is pushed further in, the detection piece 23 and the driving piece 24 are pushed further out radially by the bulge 32. This increases the amount of elastic deformation in the right region of the retainer body 21. In addition, the rotational force causing the retainer body 21 to rotate in the direction opposite to the locking direction will increase. Although the rotational force of the retainer body 21 in the locking direction will increase as the driving piece 24 is pushed out in a radially outward direction, such rotational force will not be greater than the rotational force in the direction opposite to the locking direction. Therefore, the retainer body 21 is restricted from rotating in the both directions. The restriction of the rotation of the retainer body 21 allows the left region of the retainer body 21 to elastically deform so as to expand in the radially outward direction. This causes the relative position of the rotary shaft 15 within the shaft hole 22a to shift from the left to the right. The elastic deformation of the retainer body 21 in both the left and right regions leads to a greater rotational energy to be obtained from the first energy conversion mechanism 27.

As shown in FIG. 7, when the pipe 30 is pushed further in, the entire detection piece 23 is pushed radially out of the detection hole 16. As a result, the locked state of the tip end portion 23b of the detection piece 23 with the movement restriction edge 16b is released. At this moment, the amount of elastic deformation in the right region of the retainer body 21 is at its maximum and the rotational energy in the locking direction accumulated by the first energy conversion mechanism 27 is at its maximum. When the driving piece 24 is radially pushed further outward, the rotary shaft 15 abuts the right substantially semi-circumferential surface of the shaft hole 22a. As a result, the elastic deformation in the left region of the retainer body 21 is restricted and only the rotation in the locking direction is allowed. The rotational force in the locking direction is thus accumulated in the left region of the retainer body 21. As a result, the rotational force of the retainer body 21 in the locking direction becomes greater than the rotational force in the direction opposite to the locking direction.

As shown in FIG. 9, when the pipe 30 reaches its normal insertion depth, the projecting portion 24b of the driving piece 24 abuts the outermost circumferential surface of the bulge 32. The rotational energy obtained by the second energy conversion mechanism 28 causes the retainer 20 to rotate about the rotary shaft 15 from the position shown in FIG. 7 to the main locked position shown in FIG. 9. Further, the rotational energy in the locking direction accumulated by the first energy conversion mechanism 27 is instantaneously released. This causes the retainer body 21 to deform from the radially outwardly opened state to the closed state. As a result, the retainer body 21 vigorously rotates to the main locked position.

As shown in FIG. 9, the outer peripheral portion of the retainer 20, once it has rotated to the main locked position, will have a shape corresponding to the outer peripheral portions of the front flange 14a and the rear flange 14 (see FIG. 1). This facilitates a visual confirmation that the retainer 20 is in the main locked position. As the retainer 20 rotates into the main locked position, the removal stopper piece 26 enters the locking hole 18. Thus, the removal stopper piece 26 is positioned behind the bulge 32 and prevented from being removed. And the removal stopper piece 26 reaches near the outer peripheral surface of the rear portion 31b of the pipe body 31. Thus, the removal stopper piece 26 prevents the bulge 32 from being released by moving behind the removal stopper piece 26. As the driving piece 24 has been pushed out from the detection hole 17 and abuts the outermost circumferential surface of the bulge 32, rotation of the retainer 21 in the direction opposite to the locking direction is restricted. In this way, the pipe 30 is retained in the connector 1 and maintained at the normal insertion depth.

As described above, the connector 1 includes the connector body 10 and the retainer 20, as shown in FIG. 1. The connector body 10 is formed with the hollow channel 11. The retainer 20 serves to retain the pipe 30 inserted into the hollow channel 11 of the connector body 10. The retainer 20 includes the retainer body 21, the bearing portion 22, and the detection piece 23. The retainer body 21 is formed in an arc shape so as to be attachable along the outer peripheral surface of the retainer attachment portion 14 of the connector body 10. The bearing portion 22 rotatably connects the base end of the retainer body 21 to the connector body 10, thereby allowing the retainer body 21 to rotate from the temporary locked position, toward the hollow channel 11, and into the main locked position. As shown in FIG. 6, the detection piece 23 passes through the detection hole 16 of the connector body 10 when the retainer body 21 is in the temporary locked position. Also, in the temporary locked position, the detection piece 23 projects from the retainer body 21 into the hollow channel 11. The detection piece 23 is formed with the inclined surface 23a. The detection piece 23 is pushed in the axial direction of the pipe 30 by the bulge 32 projecting radially outward from the pipe body 31 of the pipe 30 when the pipe 30 is inserted into the connector body 10. As shown in FIG. 5, the inclined surface 23a is inclined with respect to the axial direction such that the pushing force is converted to the radially outward force of the detection piece 23.

Further, as shown in FIG. 9, the retainer 20 includes the first energy conversion mechanism 27 and the removal stopper piece 26. The first energy conversion mechanism 27 converts the radially outward force of the detection piece 23, the force having been previously converted by the inclined surface 23a, into the rotational energy of the retainer body 21 in the locking direction, such that the retainer body 21 may move from the temporary locked position to the main locked position. The removal stopper piece 26 passes through the locking hole 18 of the connector body 10 when the retainer 20 is in the main locked position. The removal stopper piece 26 projects from the retainer body 21 into the hollow channel 11 when the retainer 20 is positioned at the main locked position. In this way, the removal stopper piece 26 moves to be adjacent, in the axial direction, to the bulge 32, thereby preventing the pipe 30 from being removed from the connector body 10.

Therefore, when the pipe 30 is inserted into the connector main body 10, the detection piece 23 is pushed by the bulge 32 and is subjected to the radially outward force. The retainer body 21 may then automatically rotate in the locking direction from the temporary locked position to the main locked position utilizing this radially outward force. The removal stopper piece 26 is accordingly moved adjacent to the bulge 32, which prevents removal of the pipe 30 from the connector body 10. In this way, the pipe 30 is prevented from being removed out of the connector body 10 by the single operation of inserting the pipe 30 into the connector body 10.

In addition, the amount of movement of the retainer body 21 from the temporary locked position into the main locked position may be increased, such as by utilizing the principle of leverage. The amount of movement in which the driving piece 24 is pushed by the bulge 32 of the pipe 30 depends at least in part on the radially projecting length of the bulge 32. A small amount of displacement along the radial direction of the driving piece 24 can be converted into a large amount of displacement along the circumferential direction of the retainer body 21, utilizing the principle of leverage, by rotating the retainer body 21. This leads to an increase in the amount of movement of the retainer body 21, while suppressing an increase in size of the connector 1. Further, since the apparent displacement of the retainer body 21 is large, it is easy to visually confirm whether the retainer body 21 has moved to the main locked position.

Further, even if the rotational angle of the retainer body 21 is the same, an amount of elastic deformation or a projection amount of the retainer body 21 with respect to the connector body 10 can be changed, for example, by changing the shape of the retainer body 21. For example, as shown in FIG. 6, an outer peripheral portion 21a of the retainer body 21 includes a high portion 21e, which is relatively high in a radial direction, a right region 21c on the right side of the high portion 21e, and a left region 21d on the left side of the high portion 21e. A second left region 21f is located on the left side of the left region 21d via a corner 21b. If the retainer 20 is temporarily retained in the temporary locked position, the high portion 21e is located at the highest position in the radial direction. As shown in FIG. 9, if the retainer 20 is rotated from the temporary locked position to the main locked position, the corner 21b and the second left region 21f are located at a relatively high position in the radial direction. In other words, an exposed surface of the retainer body 21 in the radially outward direction is switched when the retainer body 21 is rotated and displaced. This facilitates confirmation that the retainer body 21 has moved from the temporary locked position to the main locked position. For example, it is possible to confirm that the retainer body 21 is located at the temporary locked position by confirming that the high portion 21e is located at the high position in the radial direction. It is also possible to confirm that the retainer body 21 is located at the main locked position by confirming that the corner 21b or the second left region 21f is located at the high position in the radial direction.

Further, it is possible to convey a sense of moderation to an operator when the pipe 30 is inserted into the connector body 10. It is also possible to convey a sense of moderation when the retainer body 21 is rotated from the temporary locked position to the main locked positon. For example, a user may feel a resistance when inserting the pipe 30, for instance when the bulge 32 of the pipe 30 faces the inclined surface 24a of the driving piece 24 of the retainer 20 in the axial direction of the pipe 30. As the driving piece 24 is pushed outward from the detection hole 17 due to the rotation of the retainer body 21, there is a timing at which the bulge 32 passes the end of the inclined surface 24a. At this timing, the insertion resistance of the pipe 30 may be substantially reduced or disappear for a moment. The pipe 30 then enters further along the thickness of the end of the driving piece 24 and stops at its normal insertion position. A sense of moderation is conveyed to the operator's hand when entering to the normal position, for instance due to the resistance having disappeared. This facilitates the operator's confirmation that the pipe 30 has been inserted into the normal position and the retainer 20 has rotated to the main locked position.

As shown in FIGS. 6 and 7, the retainer 20 includes the temporary locking portion 25 that is temporarily locked to the connector body 10 when the retainer 20 is located at the temporary locked position. The first energy conversion mechanism 27 elastically deforms the retainer body 21 due to the radially outward force of the detection piece 23, so as to obtain the rotational energy. The first energy conversion mechanism 27 releases the temporary locking portion 25 from the connector body 10 by utilizing the rotational energy, such that the retainer body 21 is allowed to rotate from the temporary locked position to the main locked positon.

Therefore, the first energy conversion mechanism 27 obtains the rotational energy by utilizing the elastic deformation of the retainer body 21. This allows the retainer 20 to automatically rotate from the temporary locked position to the main locked position. As the radially outward force of the detection piece 23 increases, the amount of elastic deformation of the retainer body 21 tends to increase. The amount of elastic deformation of the retainer body 21 is small at the initial stage when the detection piece 23 starts being pushed radially outward by the bulge 32. The amount of elastic deformation of the retainer body 21 tends to increase as the amount of the detection piece 23 being pushed radially outward by the bulge 32 increases. Therefore, when the pipe 30 is inserted in the axial direction, the energy due to the elastic deformation of the retainer body 21 becomes large enough that the retainer 20 can be rotated vigorously utilizing the stored energy. Thus, the retainer 20 can be more reliably rotated from the temporary locked position to the main locked position.

Moreover, by utilizing the elastic deformation of the retainer body 21, it is possible to increase the sense of moderation (tactile sensation) when the retainer body 21 rotates from the temporary locked position to the main locked position. For example, the release of energy accumulated by the elastic deformation of the retainer body 21 and the timing at which the bulge 32 of the pipe 30 is released from the end of the driving piece 24 may be synchronized, thereby leading to an increased sense of moderation. The sense of moderation may also be improved, for example, by increasing the thickness in the right region of the retainer body 21 or by increasing the inclination angle of the inclined surface 23a of the detection piece 23, i.e., by increasing the angle of the inclined surface 23a with respect to the axis that extends in the front/rear direction. This makes it possible to increase the resistance when the retainer 20 is at the temporary locked position. In this way, the sense of moderation can be increased by synchronizing the release of energy due to the elastic deformation of the retainer body 21 and the timing at which the bulge 32 is released from the end of the driving piece 24.

As shown in FIGS. 6, 7 and 9, the detection piece 23 also serves as the temporary locking portion 25. The detection piece 23 has a structure to allow it to be moved radially outward when the pipe 30 is inserted into the connector body 10 and to temporarily be locked to the movement restricting edge 16b of the detection hole 16. Therefore, the detection piece 23 is moved radially outward by inserting the pipe 30 into the connector body 10. The detection piece 23 is temporarily locked to the connector body 10 and retains the rotational energy due to the elastic deformation of the retainer body 21. When the rotational energy is obtained, or when the detection piece 23 has gradually moved in the removal direction and removed from the connector body 10, the retainer 20 is allowed to rotate from the temporary locked position to the main locked position utilizing the rotational energy.

As shown in FIGS. 6, 7 and 9, the retainer 20 includes the driving piece 24 projecting radially inward from the bearing portion 22. When the retainer 20 is in the temporary locked position, the driving piece 24 passes through the detection hole 17 and projects from the retainer body 21 into the hollow channel 11. The inclined surface 24a is formed on the driving piece 24. The inclined surface 24a inclines so as to convert the force of the bulge 32 pushing the driving piece 24 in the axial direction of the pipe 30 when the pipe 30 is inserted into the connector body 10 into the radially outward force of the driving piece 24. For example, the inclined surface 24a is inclined with respect to a virtual plane orthogonal to the center axis extending in the front/rear direction and is oriented toward the center axis. The retainer 20 also includes the second energy conversion mechanism 28. The second energy conversion mechanism 28 is configured to convert the radially outward force of the driving piece 24, which was converted from the axial movement of the pipe 30 by the inclined surface 24a, to the rotational energy of the retainer body 21 in the locking direction, which is in a direction from the temporary locked position to the main locked position.

Therefore, the rotational energy in the locking direction can be obtained by the second energy conversion mechanism 28 as the pipe 30 is inserted into the connector body 10 and the driving piece 24 is moved radially outward. The retainer 20 in the temporary locked position is forced to rotate in the locking direction due to the rotational energy obtained by the second energy conversion mechanism 28. In addition, the rotational energy accumulated by the first energy conversion mechanism 27 that utilizes the detection piece 23 is also utilized to bias the retainer 20 toward the main locked position. Further, the retainer 20 can reliably rotate to the main locked position via the driving piece 24, for instance by allowing the pipe 30 to enter to the normal insertion position. This ensures the retainer 20 rotates more reliably from the temporary locked position to the main locked position. For example, as shown in FIG. 5, a front end of the inclined surface 24a may be positioned further forward of the front end of the inclined surface 23a. This allows the bulge 32 to continue pushing the inclined surface 24a of the driving piece 24 even after the inclined surface 23a of the detection piece 23 has been released from the bulge 32. As a result, the retainer 20 can reliably rotate from the temporary locked position to the main locked position.

As shown in FIGS. 6, 7 and 9, the driving piece 24 projects radially inward from the bearing portion 22, passes through the detection hole 17, and projects into the hollow channel 11. Therefore, the retainer body 21 includes, in the form of the detection piece 23 and the driving piece 24, force receiving pieces on each side of the retainer body 21. Inserting the pipe 30 into the connector body 10 causes the detection piece 23 and the driving piece 24, which are located on opposite sides, to move radially outward. This allows the retainer body 21 to open from both sides, such that a greater rotational energy is accumulated. The retainer 20 can thus vigorously rotate from the temporary locked position to the main locked position utilizing the elastic deformation of the retainer body 21.

As shown in FIGS. 6, 7 and 9, the connector 1 includes the rotary shaft 15 in the connector body 10. The shaft hole 22a, into which the rotary shaft 15 is inserted, is provided in the bearing portion 22 of the retainer 20. The shaft hole 22a has a radially elongated circular shape or rectangular shape. The bearing portion 22 is supported by the rotary shaft 15 and the shaft hole 22a so as to be radially movable with respect to the connector body 10. Therefore, since the rotary shaft 15 can radially move within the shaft hole 22a, the region near the bearing portion 22 of the retainer body 21 (left region) can move radially outward. This increases the amount of elastic deformation of the retainer body 21. Accordingly, the rotational energy obtained by the elastic deformation can be increased. The retainer 20 can thus be rotated vigorously from the temporary locked position to the main locked position.

A second embodiment will be described with reference to FIGS. 10 and 11. A connector 40 shown in FIG. 10 includes a connector body 50 and a retainer 60, instead of the connector body 10 and the retainer 20 shown in FIG. 1. The connector body 50 and the retainer 60 are both formed integrally of a synthetic resin material. The connector body 50 includes a hollow channel 51 that is formed inside thereof and extends along its axis. The connector body 10 is formed in an L-shape and includes the pipe receiving portion 12 and a tube connecting portion 13, similar to the connector body 10 shown in FIG. 8.

Figure 10:
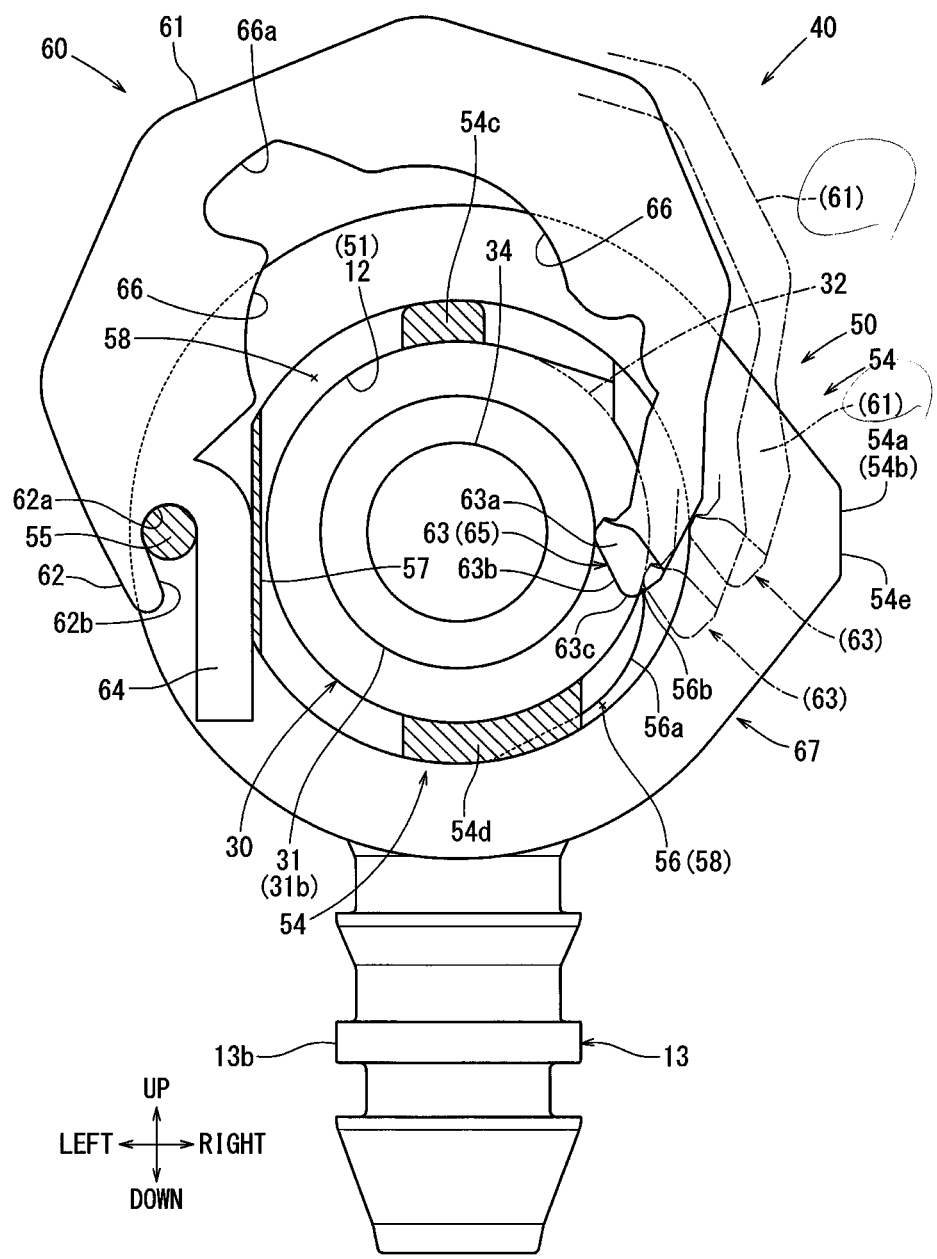
FIG. 10 is a cross-sectional view corresponding to the sectional view taken along line VI-VI in FIG. 5 when the retainer of the connector according to the second embodiment is located at the temporary locked position.

As shown in FIG. 10, a retainer attachment portion 54, to which the retainer 60 can be installed and attached, is provided on the rear outer periphery of the pipe receiving portion 12. The retainer attachment portion 54 is provided between a front flange 54a and a rear flange 54b (not shown), which are arranged in parallel to each other, in the front and rear. The front flange 54a and the rear flange 54b have an annular shape and may have, for example, a projecting portion 54e on the right side that projects further in a radial direction than the other portions. The retainer attachment portion 54 is formed in a circular arc shape along the front surface of the rear flange 54b, and has a locking hole 58 passing through the wall surface of the retainer attachment portion 54 in the radial direction. The locking hole 58 is partitioned by an upper partitioning piece 54c and a lower partitioning piece 54d, which extend in the front/rear direction between the front flange 54a and the rear flange 54b.

As shown in FIG. 10, the retainer attachment portion 54 includes a detection hole 56. The detection hole 56 opens through the wall surface of the retainer attachment portion 54 in the radial direction and in front of the right locking hole 58. The detection hole 56 communicates with the right locking hole 58. A thin portion 56a and a movement restricting edge 56b are provided below the detection hole 56, similar to the thin portion 16a and the movement restricting edge 16b shown in FIG. 6. A cylindrical rotary shaft (rotary mounting portion) 55 extending in the front/rear direction is provided on a left part of the retainer attachment portion 54. The rotary shaft 55 is arranged radially outward from the locking hole 58. A flat plate-shaped rotation restricting wall 57 extending in the front/rear direction and in the up/down direction is provided on the left end of the locking hole 58. The rotation restricting wall 57 is provided between the rotary shaft 55 and the locking hole 58.

As shown in FIG. 10, the retainer 60 has a bearing portion 62 (rotary mounting portion), instead of the bearing portion 22 of the retainer 20 shown in FIG. 6. The retainer 60 of FIG. 10 has essentially the same structures as the retainer 20 shown in FIG. 6 for the other structures. The retainer 60 of FIG. 10 has a retainer body 61 having a width that conforms to the retainer attachment portion 54. The retainer body 61 is entirely formed in substantially a C-shape. The retainer 60 has a removal stopper piece 66 projecting radially inward of the retainer body 61. The removal stopper piece 66 has a width equal to substantially a half of a front-to-rear width of the retainer body 61. The removal stopper piece 66 is located along the rear edge of the retainer body 61. A relief recess 66a that serves to avoid the interference with upper partitioning piece 54c is formed in the circumferential center of the removal stopper piece 66.

As shown in FIG. 10, a detection piece 63 (force receiving piece), which may also be configured to serve also as a temporary locking portion 65, and an energy conversion mechanism 67 are provided at the tip end of the retainer body 61 (right end in FIG. 10). The detection piece 63 projects radially inward of the retainer body 61 and forms a wedge shape. The detection piece 63 has a width equal to about substantially a half of the front-to-rear width of the retainer body 61 and is positioned closer to the rear flange 54b. The detection piece 63 has a tip end portion 63b at the projecting end. The tip end portion 63b also has a branch portion 63c in an intermediate position of an end edge, similar to the tip end portion 23b of FIG. 6. An inclined surface 63a that is inclined is formed so as to be tapered orienting from the radially inner side toward the radially outer side and between the front side and the rear side. The inclined surface 63a includes a gradient to allow a partial force, which corresponds to a force caused by abutment of the bulge 32 of the pipe 30 being inserted to the front side, to act as a radial force to push the detection piece 63 outside of the detection hole 56.

As shown in FIG. 10, a bearing portion 62, into which the rotary shaft 55 can be inserted, is provided at a base end of the retainer body 61 (left side in FIG. 10). The bearing portion 62 has an insertion opening 62b that opens to have substantially a C-shaped cross-section over the entire frontto-rear width of the retainer 60. The bearing portion 62 has a shaft hole 62*a* that is recessed circularly inward from the insertion opening 62*b*. The shaft hole 62*a* has an inner diameter that is slightly larger than the rotary shaft 55. The retainer 60 can rotate about the rotary shaft 55 relative to the connector body 50 and on a plane orthogonal to the axial direction of the pipe 30. The retainer 60 includes a rotation restricting portion 64 on an inner peripheral side of the base end of the retainer body 61. The rotation restricting portion 64 is formed linearly along an extending direction of the tip end of the bearing portion 62. The rotation restricting portion 64 faces the rotation restricting wall 57 and can abut the rotation restricting wall 57 when the retainer 60 rotates in the direction opposite to the locking direction.

As shown in FIG. 10, the retainer body 61 includes the energy conversion mechanism 67. The energy conversion mechanism 67 provides the rotational energy in the locking direction (clockwise direction in FIG. 6) by utilizing the detection piece 63, the rotation restricting portion 64, and the rotation restricting wall 57. The retainer body 61 obtains the rotational force in the direction opposite to the locking direction due to the radially outward force of the detection piece 63. The retainer body 61 is restricted from rotating in the direction opposite to the locking direction, in part due to the rotation restricting portion 64 abutting the rotation restricting wall 57. The right region of the retainer body 61 elastically deforms so as to expand radially outward, in part due to being subjected to the rotational force in the direction opposite to the locking direction and by it being restricted from rotating in the direction opposite to the locking direction. The energy conversion mechanism 67 converts the force accumulated due to the elastic deformation of the retainer body 61 into the rotational energy of the retainer body 61 in the locking direction.

A locking structure of the retainer 60 to the connector body 50 will be described. The retainer 60 shown in FIG. 10 can be temporary retained by the retainer attachment portion 54 in the temporary locked position. This may be done when the tip end portion 63*b* of the detection piece 63 locks to the movement restricting edge 56*b*. The detection piece 63 enters from the detection hole 56 and projects into the hollow channel 51. The rotation restricting portion 64 faces and abuts the rotation restricting wall 57 in a temporary locked state. The removal stopper piece 66 is retracted outside the locking hole 58 of the pipe receiving portion 12 so that the pipe 30 is allowed to enter or to be removed when the retainer 60 is located at the temporary locked position.

As shown in FIG. 10, as the pipe 30 is inserted into the hollow channel 51, the bulge 32 abuts the inclined surface 63*a*, thereby pushing the detection piece 63 out of the detection hole 56. The position where the tip end portion 63*b* of the detection piece 63 locks to the movement restricting edge 56*b* is switched from the right side of the branch portion 63*c* to the left side. The right region of the retainer body 61 gains the rotational force about the rotary shaft 55 in the direction opposite to the locking direction due to the radially outward force of the detection piece 63. The rotation restricting portion 64 abuts the rotation restricting wall 57 when the retainer body 61 rotates in the direction opposite to the locking direction. The retainer body 61 restricts rotation in the direction opposite to the locking direction when the rotation restricting portion 64 abuts the rotation restricting wall 57. This causes the right region of the retainer body 61 to elastically deform so as to be opened in the radially outward direction. The energy conversion mechanism 67 can thus accumulate the rotational energy, which can then be used to rotate the retainer body 61 in the locking direction.

As shown in FIG. 10, when the pipe 30 is further pushed forward, the detection piece 63 is pushed radially outward of the detection hole 56. As a result, the locked state between the tip end portion 63*b* of the detection piece 63 and the movement restricting edge 56*b* is released. The rotation restriction of the retainer body 61 in the locking direction is released while being maximally opened in the radially outward direction. At this moment, the rotational energy accumulated in the energy conversion mechanism 67 is at its maximum. The retainer 60 rotates from the temporary locked position shown in FIG. 10 to the main locked position shown in FIG. 11, due to the rotational energy accumulated by the energy conversion mechanism 67. This may be done when the detection piece 63 reaches the outermost peripheral surface of the bulge 32 and the interference with the detection hole 56 is eliminated. At this time, the rotation restriction portion 64 moves away from the rotation restricting wall 57.

Figure 11:
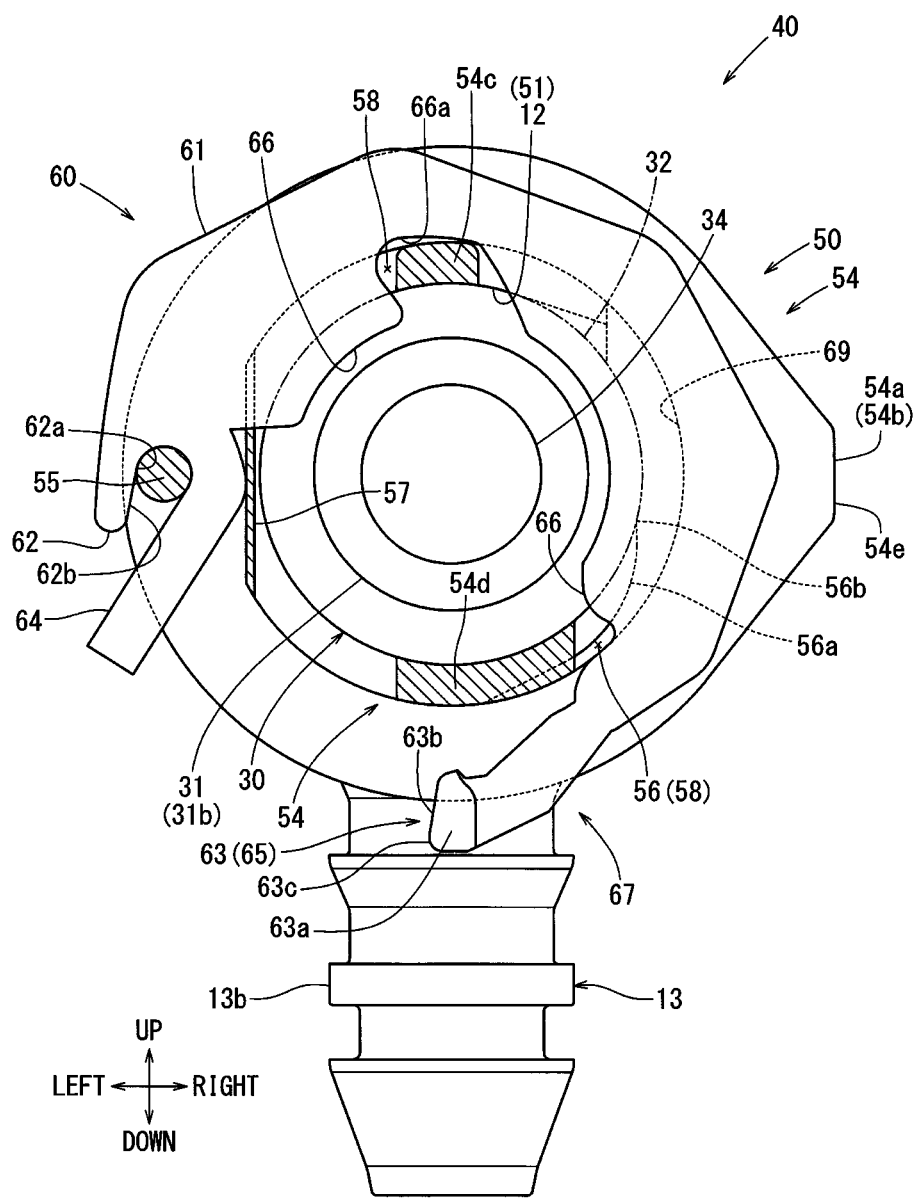
FIG. 11 is a cross-sectional view corresponding to a sectional view taken along line IX-IX in FIG. 8 when the retainer of the connector according to the second embodiment is located at the main locked position.

As shown in FIG. 11, as the retainer 60 rotates to the main locking position, the removal stopper piece 66 enters the locking hole 58, moves to be adjacent to the rear side of the bulge 32, and reaches near the outer peripheral surface of the rear portion 31*b* of the pipe body 31. The removal stopper piece 66 prevents the bulge 32 from being released. The removal stopper piece 66 also retains the bulge 32 in a state where the outer peripheral surface of the retainer attachment portion 54 is in close contact with an inner peripheral surface 69 at the front portion of the retainer 60. Further, the inner peripheral surface 69 in the right region of the retainer 60 comes closely into a position where it goes around more than a half of the circumference into the main locking position. As a result, the removal prevented state can be maintained, for instance since the retainer 60 is prevented from rotating in the direction opposite to the locking direction. The inner peripheral surface 69 is made thicker in the radial direction so as to be allowed to come in close contact with the outer peripheral surface of the retainer attachment portion 54. When in the main locking position, this restricts rotation in the direction opposite to the locking direction, without the need for the rotation restricting portion 64 to be abutted to the rotation restricting wall 57. This also allows the retainer 60 to be retained to the retainer attachment portion 54 without wobbling.

As described-above and shown in FIG. 10, the retainer 60 of the connector 40 includes the detection piece 63 at the tip end of the retainer body 61. The retainer 60 includes the rotation restricting portion 64 extending from the bearing portion 62 at the base end of the retainer body 61. The rotation restricting portion 64 abuts the rotation restricting wall 57 of the connector body 50, such that the retainer body 61 is prevented from rotating in the direction opposite to the clockwise direction (i.e. locking direction) when the force is applied to the detection piece 63.

Therefore, the detection piece 63 moves radially outward due to the pipe 30 being inserted into the connector body 50. The rotation restricting portion 64 prevents the retainer body 61 from rotating in the direction opposite to the locking direction. As a result, the retainer body 61 elastically deforms, with the rotary shaft 55 acting as a fulcrum, so as to accumulate the rotational energy. The rotational energy acts greater at the tip end of the retainer body 61, the portion that goes away from the bearing portion 62 at the base end of the retainer body 61 having the rotary shaft 55 acting as a fulcrum, due to the principle of leverage. This allows the retainer 60 to rotate vigorously from the temporarily locked position to the main locked position utilizing the elastic deformation of the retainer body 61. As a result, the abutting position of the detection piece 63, which is at the tip end of the retainer 60, with the bulge 32 may be set below the center of axis of the pipe 30, once it has been inserted into the hollow channel 51. Even with this structure, the detection piece 63 abuts the bulge 32 and the retainer body 61 elastically deforms radially outward. The retainer body 61 rotates in the locking direction utilizing its reaction force and moves into the main locking position.

A third embodiment will be described with reference to FIGS. 12 and 13. A connector 70 shown in FIG. 12 includes a retainer 90, instead of the retainer 20 shown in FIG. 1. The retainer 90 of FIG. 12 includes a bearing portion 92 and a tip end portion 93, instead of the bearing portion 22 and the detection piece 23 of the retainer 20 shown in FIG. 6. For the other structures, the retainer 90 of FIG. 12 generally has the same structures as the retainer 20 shown in FIG. 6. The retainer 90 has a retainer body 91 having a width that conforms to the retainer attachment portion 14, the retainer body 91 being entirely formed in substantially a C-shape. The retainer 90 has a removal stopper piece 95 projecting radially inward of the retainer body 91. The removal stopper piece 95 has a width equal to substantially half of a front-to-rear width of the retainer body 91. The removal stopper piece 95 is located along the rear edge of the retainer body 91. A relief recess 95a is formed in the circumferential center of the removal stopper piece 95.

Figure 12:
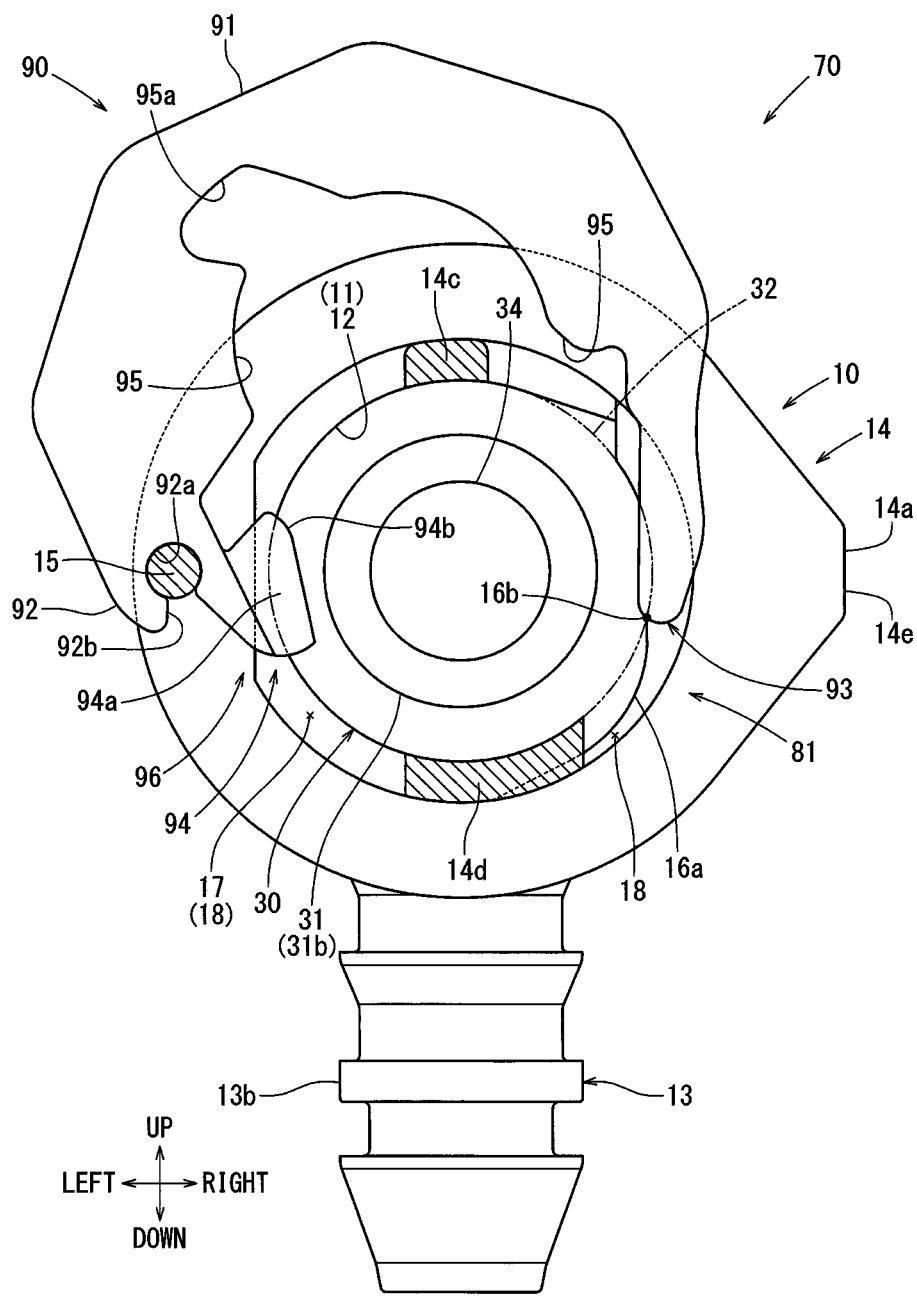
FIG. 12 is a cross-sectional view corresponding to the sectional view taken along line VI-VI in FIG. 5 when a retainer of a connector according to a third embodiment is positioned at the temporary locked position.

As shown in FIG. 12, a bearing portion 92, into which the rotary shaft 15 can be inserted, is provided at the base end of the retainer body 91 (left side in FIG. 12). The bearing portion 92 has an insertion opening 92b that opens to have a substantially C-shaped cross-section over the entire front-to-rear width of the retainer 90. The bearing portion 92 has a shaft hole 92a that is recessed circularly inward from the insertion opening 92b. The shaft hole 92a has an inner diameter that is slightly larger than the rotary shaft 15. The retainer 90 can rotate about the rotary shaft 15 relative to the connector body 10 and along a plane orthogonal to the axial direction of the pipe 30.

As shown in FIG. 12, a driving piece 94 (force receiving piece), which projects radially inward in a wedge shape, is provided at the base end of the retainer 90. The driving piece 94 is provided further to the end side of the retainer body 91 than the bearing portion 92. When the retainer 90 is in the temporary locked position, the driving piece 94 enters through the detection hole 17 and projects into the hollow channel 11. The driving piece 94 includes a projecting portion 94b at its projecting end. An inclined surface 94a is inclined so as to be tapered in a direction orienting from the radially inner side toward the outer side and between the front side and the rear side. The inclined surface 94a abuts the bulge 32 when the pipe 30 is inserted into the connector body 10. The inclined surface 94a inclines with respect to the axial direction such that the force used to push the bulge 32 in the axial direction of pipe 30 can be converted to the radially outward force of the driving piece 94. The retainer 90 includes an energy conversion mechanism 96 configured to convert the radially outward force of the driving piece 94, which was converted from the axial insertion force of the pipe 30 via the inclined surface 94a, into the rotational energy in the locking direction (clockwise direction in FIG. 12).

As shown in FIG. 12, the tip end portion 93 is provided at the tip end (right side in FIG. 12) of the retainer body 91. The retainer body 91 extends forming an arc shape between the tip end portion 93 and the driving piece 94, so as to cover more than half of the circumference of the outer peripheral surface of the retainer attachment portion 14. An initial position retaining member 81 is provided between the connector body 10 and the retainer 90. The initial position retaining member 81 locks the retainer 90 in its initial position, so as to allow the pipe 30 to be inserted into the pipe receiving portion 12. The initial position of the retainer 90 corresponds to the position where the retainer 90 is rotated with respect to the main locked position in the direction opposite to the locking direction. The initial position retaining member 81 may be, for example, a dust seal that is interposed between the connector body 10 and the retainer 90. The initial position retaining member 81 may be, for example, a pair of magnets, each of the pair of magnets being provided on the retainer attachment portion 14 and the retainer 90 and configured to attract each other. Further, as illustrated, the retainer 90 may also be retained in the temporary locked position by having the movement restricting edge 16b face the tip end portion 93.

A structure to lock the retainer 90 to the connector body 10 will be described. The pipe 30 is to be inserted into the hollow channel 11 when the retainer 90 is in the state where it is positioned at the temporary locked position, as shown in FIG. 12. When the retainer 90 is located at the temporary locked position, the removal stopper piece 95 is retracted to the outer side of the locking hole 18 of the pipe receiving portion 12. This allows for the entry or the removal of the pipe 30. The bulge 32 pushes the driving piece 94 out of the detection hole 17 and the driving piece 94 reaches to the outer side than the bulge 32, when the inclined surface 94a of the driving piece 94 abuts the bulge 32. The amount by which the driving piece 94 is pushed in the radially outward direction will be at its maximum when the inclined surface 94a abuts the outermost peripheral surface of the bulge 32. The rotational energy, which may be used to rotate the retainer body 91 in the locking direction, can be obtained by the energy conversion mechanism 96. The tip end portion 93 is made to be movable when it is brought into a state where its corresponding rotational energy is not interfered with, such as when the tip end portion 93 moves radially outward from the position facing the movement restricting edge 16b. This releases the restriction on the retainer body 91 from rotating in the locking direction.

The retainer 90 is thus allowed to rotate about the rotary shaft 15, at least in part due to the rotational energy obtained by the energy conversion mechanism 96. The retainer 90 may rotate from the temporary locking position, shown in FIG. 12, to the main locking position, shown in FIG. 13.

Figure 13:
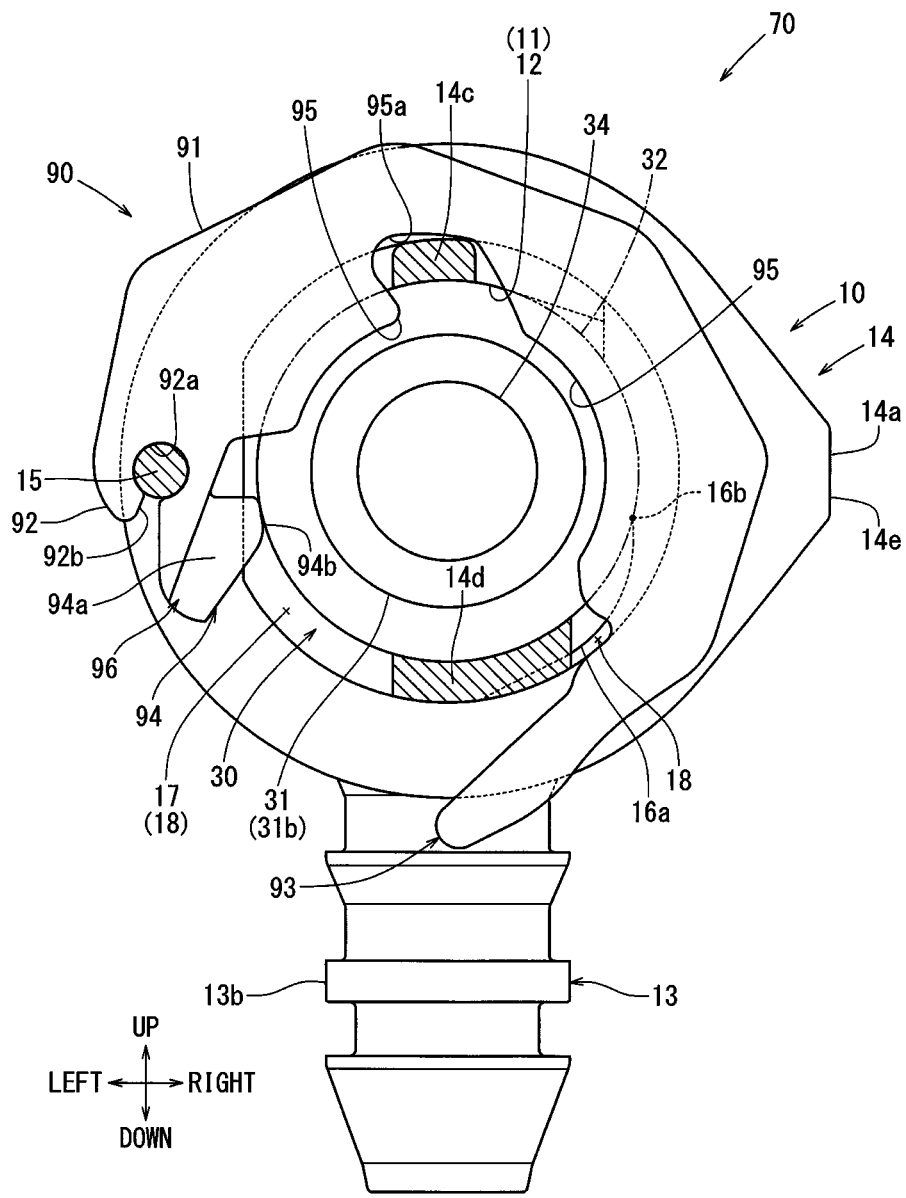
FIG. 13 is a cross-sectional view corresponding to the sectional view taken along line IX-IX in FIG. 8 when the retainer of the connector according to the third embodiment is positioned at the main locked position.

As shown in FIG. 13, as the pipe 30 is inserted to reach its normal insertion depth, the entire driving piece 94 is pushed radially outward from the detection hole 17. The removal stopper piece 95 enters the locking hole 18, moves to be adjacent to the rear side of the bulge 32, and reaches a position near the outer peripheral surface of the rear portion 31b of the pipe body 31. This is done when the retainer 90 rotates toward the main locking position. As the driving piece 94 is pushed out of the detection hole 17 and is in contact with the outermost peripheral surface of the bulge 32, the driving piece 94 restricts rotation in the direction opposite to the locking direction of the retainer body 91. As a result, the pipe 30 is retained in the connector 70 at its normal insertion depth.

As described above, the energy conversion mechanism 96 of the connector 70 is configured to generate torque to rotate the retainer body 91 about the rotary shaft 15, from the temporary locked position to the main locked position. This may be at least in part due to the radially outward force of the driving piece 94, as shown in FIGS. 12 and 13. Therefore, the retainer 90 is forced to rotate from the temporary locked position to the main locked position only by the operation of inserting the pipe 30 into the connector body 10. As a result, the retainer 90 prevents the pipe 30 connected to the connector main body 10 from coming off.

As shown in FIG. 12, the retainer body 91 extends with a length enough to cover the outer peripheral surface of the retainer attachment portion 14. The driving piece 94 projects radially inward from the base end of the retainer body 91. The bearing portion 92 is provided on the side of the retainer body 91 further than the side of the retainer body 91 with the driving piece 94 and further to the tip end side of the retainer body 91 than to the base end of the retainer body 91. The connector 70 includes the rotary shaft 15 on the connector body 10 and the shaft hole 92a in the bearing portion 92. The shaft hole 92a is for the rotary shaft 15 to be inserted.

Therefore, from the position where the retainer 90 is positioned at the temporary locked position, the driving piece 94 may be moved radially outward by inserting the pipe 30 into the connector body 10. The tip end of the retainer body 91 rotates radially inward about the rotary shaft 15 on the base end side of the retainer body 91. This may be due to the principle of leverage. This is the rotation in the locking direction, where the retainer 90 moves from the temporary locked position to the main locked position. Moving the driving piece 94 in the radially outward direction thus allows the retainer body 91 to move from the temporary locked position to the main locked position. In this way, as the pipe 30 is allowed to enter up to the normal insertion position, the retainer body 91 is forced to be displaced and to rotate up to the main locked position. As a result, the retainer 90 is retained with respect to the retainer attachment portion 14.

Various modifications may be made to the connector 1, 40, 70 of the first to third embodiments, some examples of which are provided below. The connector body 10, 50 and the retainer 20, 60, 90 may be made of a metal, such as, for example, aluminum. The pipe body 31 and the bulge 32 may be integrally formed of, for example, a synthetic resin. For example, the retainer 20, 60, 90 may be provided with a rotary shaft and the connector body 10, 50 may be provided with a bearing portion for supporting the rotary shaft.

Alternative to the inclined surface 23a, 63a of the detection piece 23, 63 and the inclined surface 24a, 94a of the driving piece 24, 94, a tapered inclined surface may be provided at the outer periphery on a front side of the bulge 32 at the pipe 30. In other words, the detection piece 23, 63 may have a rear side at the tip end portion, and the rear side may be substantially parallel to a plane orthogonal to an axis extending in the front/rear direction. The rear side of the detection piece 23, 63 is pushed radially outward by the inclined surface defined in the front region of the bulge 32 of the pipe 30. The timing at which the detection piece 23 and the driving piece 24 move radially outward may be freely set in accordance with the gradient of the inclined surface 23a, 24a. For example, the detection piece 23 and the driving piece 24 may simultaneously move in the radially outward direction. Alternatively, for example, the detection piece 23 may move first in the radially outward direction.

Figure 14:
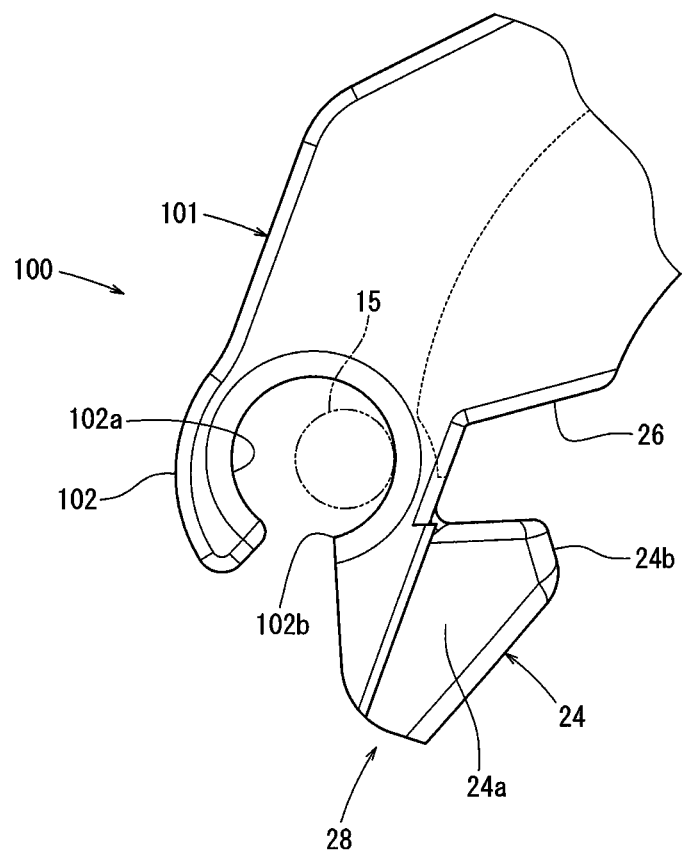
FIG. 14 is a partial enlarged view of a left region of a retainer according to another embodiment.

As described-above, the shaft hole 22a is formed in an elongated circular shape with its long diameter extending along the radial direction of the retainer body 21. Alternatively, for example, as a retainer 100 shows in FIG. 14, a substantially circular shaft hole 102a larger than the rotary shaft 15 may be provided. A retainer body 101 of the retainer 100 may include an insertion opening 102b at a bearing portion 102 in the left region, into which the rotary shaft 15 can be inserted. The retainer body 101 may also include the shaft hole 102a provided at the upper side of the insertion opening 102b, as shown in the figure. The shaft hole 102a is connected to the insertion opening 102b and is opened at the lower side in the figure with a substantially C-shaped cross-section. An inner diameter of the shaft hole 102a is larger than an outer diameter of the rotary shaft 15. Therefore, the relative position of the rotary shaft 15 may be shifted, for example, in the radial direction of the retainer body 101 within the shaft hole 102a. The rotary shaft 15 may shift, for example, in the radial direction within the shaft hole 102a as the driving piece 24 is pushed radially outward by the bulge 32 of the pipe 30 (see FIG. 7). As a result, the left region of the retainer body 101 opens in the radially outward direction.

Figure 15:
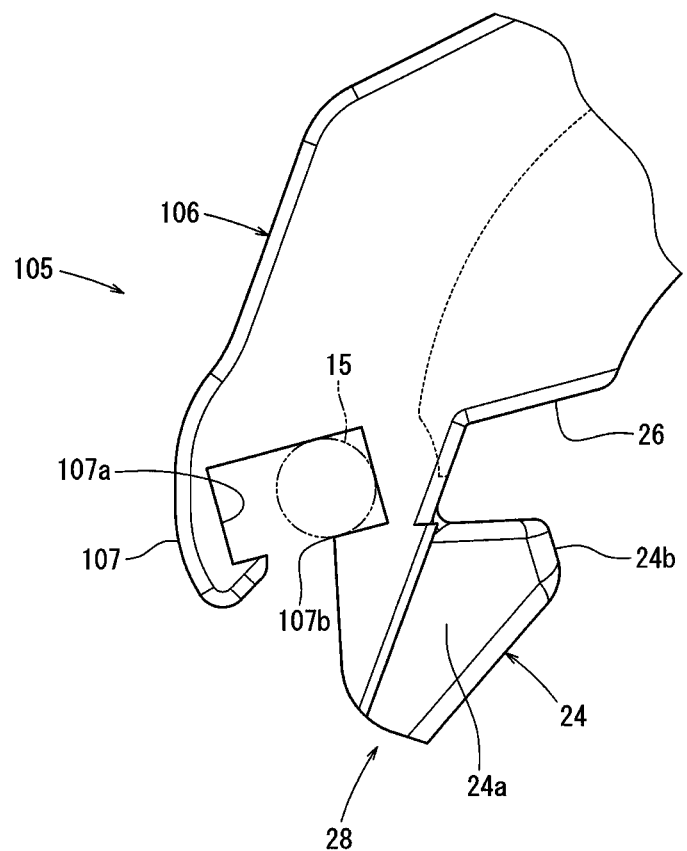
FIG. 15 is a partial enlarged view of a left region of a retainer according to yet another embodiment.

The shaft hole 22a has an elongated circular shape as described above. Alternatively, for example, a substantially rectangular shaft hole 107a larger than the rotary shaft 15 may be provided as a retainer 105, as shown in FIG. 15. The retainer body 106 of the retainer 105 may include an insertion opening 107b in the left region of the bearing 107, into which the rotary shaft 15 can be inserted. A shaft hole 107a provided on the upper side of the insertion opening 107b, as shown in the figure. The shaft hole 107a is connected to the insertion opening 107b at its lower center. The shaft hole 107a includes a short side that is substantially equal to the outer diameter of the rotary shaft 15 and a long side that is larger than the outer diameter of the rotary shaft 15. This allows the rotary shaft 15 to relatively move, for example, in the radial direction of the retainer body 106 within the shaft hole 107a. The rotary shaft 15 may shift, for example in the radial direction within the shaft hole 107a as the driving piece 24 is pushed radially outward by the bulge 32 of the pipe 30 (see FIG. 7). The left region of the retainer body 106 thus opens outward in the radial direction.

Further, it is also possible to have a structure in which a part of the bulge 32 other than the outer most peripheral surface pushes the driving piece 24, 94 out when the pipe 30 moves toward the normal position and when the state where the driving piece 24, 94 pushed out by the bulge 32 is maintained. For example, the outer peripheral edge of the bulge 32 may be non-circular as seen in the front/rear direction. It is also possible that a part different from the part with the longest radial length of the bulge 32 pushes the detection piece 23 or the driving piece 24. Alternatively, instead of moving the bulge 32 in the axial direction, it is also possible to allow the bulge 32 to rotate about the axis to cause a part of the outer peripheral edge of the bulge 32 to push the detection piece 23 and/or the driving piece 24. For example, as described-above, the driving piece 24, 94 may include an inclined surface 24a, 94a on the rear side, the inclined surface 24a, 94a being inclined in a direction from the inside to the outside in the radial direction and from the front side to the rear side. Alternatively, the driving piece 24, 94 may include an inclined surface on the front side, the inclined surface 24a, 94b being inclined in a direction from the outside to the inside in the radial direction between the front side to the rear side, contrary to the inclined surface 24a, 94a. This causes the front inclined surface of the driving piece 24, 94 to abut the bulge 32 when the pipe 30 is pulled in the direction opposite to the insertion direction, so that the retainer body 21, 91 is forced to rotate in the locking direction.

As shown in FIG. 8, the pipe 30 includes the bulge 32 projecting from the pipe body 31 in the radial direction. An inclined surface having a diameter decreasing toward the front side is formed at a front region of the bulge 32. As shown in FIG. 1, when the pipe 30 is inserted into the hollow channel 11 of the connector body 10, the inclined surface of the bulge 32 pushes the detection piece 23 and/or the driving piece 24. The inclined surface guides the detection piece 23 and the driving piece 24 to the outer peripheral surface of the bulge 32. Alternative to the pipe 30 shown in FIG. 8, a pipe 110 shown in FIG. 16, for example, may be utilized.

Figure 16:
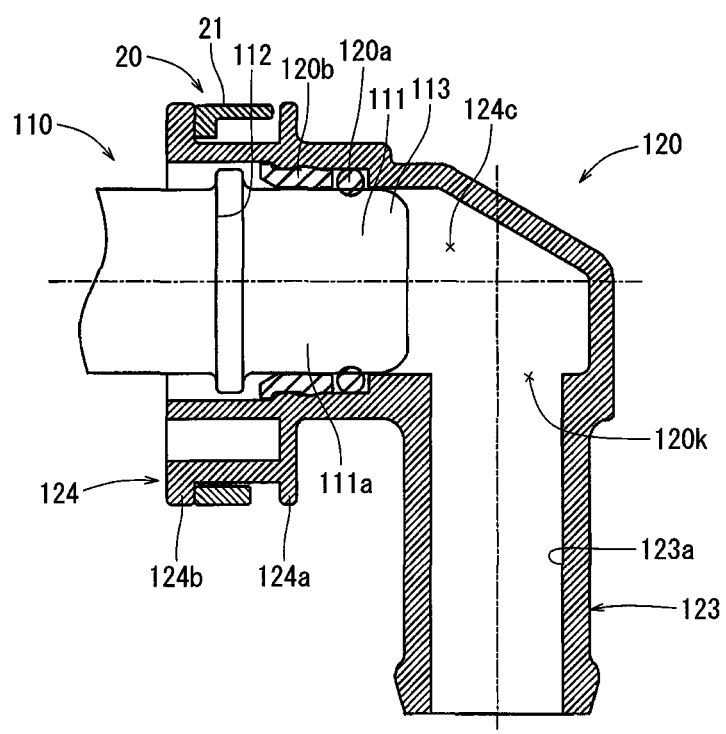
FIG. 16 is a cross-sectional view of a connector corresponding to FIG. 8 according to another embodiment.

As shown in FIG. 16, the pipe 110 includes a hollow cylindrical pipe body 111 and a bulge 112 projecting radially outward from the outer peripheral surface of the pipe body 111. An inclined surface is not formed or only a small inclined surface is formed in the front region and the rear region of the bulge 112. The diameter of the small inclined surface may be so small that it does not come in contact with the detection piece 23 and the driving piece 24 of the retainer 20 shown in FIG. 1, for example, when the pipe 110 is inserted into a hollow channel (flow channel 120*h*) of a connector body 120.

As shown in FIG. 16, a tapered front end portion 113 may be formed at the front side of the pipe body 111. The pipe 110 may be attached to either connector body 10 shown in FIG. 8 or the connector body 120 shown in FIG. 16. The connector body 120 shown in FIG. 16 has a similar structure to that of the connector body 10 shown in FIG. 8, and includes a tube connecting portion 123 and a retainer attachment portion 124. A flow channel 123*a* of the tube connection portion 123 and a flow channel 124*c* of the retainer attachment portion 124 communicate via a communication opening 120*k* and have a diameter of substantially the same size as the diameters of the flow channels 123*a*, 124*c*. A front flange 124*a* and the rear flange 124*b* are arranged in parallel in front and rear on the outer periphery of the connector body 120. The retainer 20 is attached to the retainer attachment portion 124 between the front flange 124*a* and the rear flange 124*b*. An O-ring 120*a* and a bushing 120*b* are attached on the inner periphery in the front region of the connector body 120.

The various examples described in detail above, with reference to the attached drawings, are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, so as to provide an improved connector, and/or methods of making and using the same.

The invention claimed is:

1. A connector for piping connection, comprising:
a connector body having a hollow channel; and
a retainer configured to prevent a pipe inserted into the hollow channel of the connector body from being removed out of the connector body,
wherein the retainer comprises:
a retainer body formed in a shape capable of being attached along an outer peripheral surface of the connector body;
a rotary mounting portion configured to rotatably connect a base end of the retainer body to the connector body to allow the retainer body to rotate from a temporary locked position to a main locked position;
a force receiving piece extending from the retainer body, the force receiving piece extending through a detection hole of the connector body and into the hollow channel when the retainer body is in the temporary locked position;
an inclined surface formed on the force receiving piece and/or a bulge of the pipe, the inclined surface being inclined with respect to an axial direction so as to convert a pushing force pushing against the force receiving piece in an axial direction into a radially outward force of the force receiving piece;
an energy conversion mechanism configured to convert the radially outward force of the force receiving piece into rotational energy of the retainer body in a locking direction from the temporary locked position to the main locked position; and
a removal stopper piece, the removal stopper piece penetrating a locking hole of the connector body, projecting from the retainer body and into the hollow channel, and being adjacent to the bulge of the pipe in the axial direction when the retainer is located at the main locked position, wherein:
the removal stopper piece is configured to prevent the pipe from being removed out of the connector body,
the bulge projects radially outward from a pipe body of the pipe,
the bulge applies the pushing force to the force receiving piece as the pipe is inserted into the connector body,
the retainer includes a temporary locking portion temporarily locked to the connector body when the retainer is located at the temporary locked position, and
the energy conversion mechanism is configured to allow the retainer body to be elastically deformed due to the radially outward force of the force receiving piece to store the rotational energy, the energy conversion mechanism being configured to utilize the rotational energy to release the temporary locking portion from the connector body and to cause the retainer body to rotate from the temporary locked position to the main locked position,
the force receiving piece is located at a tip end portion of the retainer body,
the retainer includes a rotation restricting portion extending from the rotary mounting portion, and
the rotation restricting portion abuts the connector body so as to prevent the retainer body from rotating in a direction opposite to the locking direction due to the pushing force applied to the force receiving piece.

2. The connector according to claim 1, wherein:
the force receiving piece is a detection piece that also serves as the temporary locking portion, and
the force receiving piece moves radially outward and is temporary locked at an edge of the detection piece when the pipe is being inserted into the connector body.

3. The connector according to claim 2, wherein:
the retainer further comprises a driving piece projecting radially inward from the rotary mounting portion,
the driving piece passes through a second detection hole of the connector body and projects from the retainer body into the hollow channel when the retainer is in the temporary locked position,
a second inclined surface is formed on the driving piece and/or the bulge, the second inclined surface being inclined with respect to the axial direction so as to convert the pushing force pushing against the driving piece into a radially outward force of the driving piece, the bulge applies the pushing force to the driving piece as the pipe is inserted into the connector body, and a second energy conversion mechanism is provided to convert the radially outward force of the driving piece into the rotational energy of the retainer body in the locking direction from the temporary locked position to the main locked position.

4. The connector according to claim 3, wherein:
a rotary shaft is provided at either one of the rotary mounting portion of the retainer or the connector body,
the rotary shaft is configured to radially and movably support the rotary mounting portion of the retainer with respect to the connector body, and
the other one of the rotary mounting portion of the retainer or the connector body not provided with the rotary shaft is formed with a shaft hole larger than the rotary shaft and into which the rotary shaft is inserted.

5. The connector according to claim 1, wherein the energy conversion mechanism is configured to generate the rotational energy in the form of torque to rotate the retainer body about the rotary mounting portion from the temporary locked position to the main locked position from the radially outward force of the force receiving piece.

6. The connector according to claim 1, wherein:
the retainer body has a length sufficient to traverse an outer peripheral surface of the connector body from one side of the connector body to an opposite side of the connector body,
the force receiving piece projects radially inward from the base end of the retainer body,
the rotary mounting portion is provided at a radially outer side of the retainer body with respect to the force receiving piece and is provided at a tip end side of the retainer body, which is located on a side of the retainer body opposite to the base end of the retainer body, and
a rotary shaft is provided at either one of the rotary mounting portion of the retainer or the connector body, and the other one of the rotary mounting portion of the retainer or the connector body that is not provided with the rotary shaft is formed with a shaft hole into which the rotary shaft is inserted.

7. The connector according to claim 1, wherein the retainer body is configured to rotate from the temporary locked position and into the main locked position upon the pipe being inserted into the hollow channel of the connector body, without subsequent user intervention.

8. The connector according to claim 1, wherein the pushing force alone, upon conversion by the energy conversion mechanism, is sufficient to move the retainer entirely between the temporary locked position and the main locked position.

9. A connector for piping connection, comprising:
a connector body having a hollow channel; and
a retainer configured to prevent a pipe inserted into the hollow channel of the connector body from being removed out of the connector body,
wherein the retainer comprises:
a retainer body formed in a shape capable of being attached along an outer peripheral surface of the connector body;
a rotary mounting portion configured to rotatably connect a base end of the retainer body to the connector body to allow the retainer body to rotate from a temporary locked position to a main locked position;
a force receiving piece extending from the retainer body, the force receiving piece extending through a detection hole of the connector body and into the hollow channel when the retainer body is in the temporary locked position;
an inclined surface formed on the force receiving piece and/or a bulge of the pipe, the inclined surface being inclined with respect to an axial direction so as to convert a pushing force pushing against the force receiving piece in an axial direction into a radially outward force of the force receiving piece;
an energy conversion mechanism configured to convert the radially outward force of the force receiving piece into rotational energy of the retainer body in a locking direction from the temporary locked position to the main locked position; and
a removal stopper piece, the removal stopper piece penetrating a locking hole of the connector body, projecting from the retainer body and into the hollow channel, and being adjacent to the bulge of the pipe in the axial direction when the retainer is located at the main locked position, wherein:
the removal stopper piece is configured to prevent the pipe from being removed out of the connector body,
the bulge projects radially outward from a pipe body of the pipe,
the bulge applies the pushing force to the force receiving piece as the pipe is inserted into the connector body,
the retainer includes a temporary locking portion temporarily locked to the connector body when the retainer is located at the temporary locked position, and
the energy conversion mechanism is configured to allow the retainer body to be elastically deformed due to the radially outward force of the force receiving piece to store the rotational energy, the energy conversion mechanism being configured to utilize the rotational energy to release the temporary locking portion from the connector body and to cause the retainer body to rotate from the temporary locked position to the main locked position, and
the force receiving piece is a driving piece that projects radially inward from the rotary mounting portion, passes through the detection hole of the connector body, and projects into the hollow channel.

10. A connector for piping connection, comprising:
a connector body having a hollow channel; and
a retainer configured to prevent a pipe inserted into the hollow channel of the connector body from being removed out of the connector body,
wherein the retainer comprises:
a retainer body formed in a shape capable of being attached along an outer peripheral surface of the connector body;
a rotary mounting portion configured to rotatably connect a base end of the retainer body to the connector body to allow the retainer body to rotate from a temporary locked position to a main locked position;
a force receiving piece extending from the retainer body, the force receiving piece extending through a detection hole of the connector body and into the hollow channel when the retainer body is in the temporary locked position;
an inclined surface formed on the force receiving piece and/or a bulge of the pipe, the inclined surface being inclined with respect to an axial direction so as to convert a pushing force pushing against the force receiving piece in an axial direction into a radially outward force of the force receiving piece;
an energy conversion mechanism configured to convert the radially outward force of the force receiving piece into rotational energy of the retainer body in a locking direction from the temporary locked position to the main locked position; and a removal stopper piece, the removal stopper piece penetrating a locking hole of the connector body, projecting from the retainer body and into the hollow channel, and being adjacent to the bulge of the pipe in the axial direction when the retainer is located at the main locked position, wherein:

the removal stopper piece is configured to prevent the pipe from being removed out of the connector body, the bulge projects radially outward from a pipe body of the pipe, the bulge applies the pushing force to the force receiving piece as the pipe is inserted into the connector body, the connector further comprises a rotation prevention structure configured to prevent rotation of the retainer in a direction opposite to the locking direction, and the rotation prevention structure includes the inclined surface of the force receiving piece.

11. The connector according to claim 10, wherein the rotation prevention structure is configured to prevent rotation of the retainer in the direction opposite to the locking direction while the pushing force is pushing against the force receiving piece.

12. The connector according to claim 10, wherein the rotation prevention structure includes an inclined surface inclined with respect to axial direction so as to convert a pushing force of the bulge of the pipe into a rotation prevention force.

* * * * *